US008131291B2

(12) United States Patent
Jeong et al.

(10) Patent No.: US 8,131,291 B2
(45) Date of Patent: Mar. 6, 2012

(54) FAST ACTIVE SCANNING WIRELESS NETWORK APPARATUS AND METHOD

(75) Inventors: Moo Ryong Jeong, San Jose, CA (US); Fujio Watanabe, Sunnyvale, CA (US); Toshiro Kawahara, Saratoga, CA (US)

(73) Assignee: NTT Docomo, Inc., Tokyo (JP)

( * ) Notice: Subject to any disclaimer, the term of this patent is extended or adjusted under 35 U.S.C. 154(b) by 201 days.

(21) Appl. No.: 10/545,466

(22) PCT Filed: Apr. 2, 2004

(86) PCT No.: PCT/US2004/010390
§ 371 (c)(1),
(2), (4) Date: Aug. 11, 2005

(87) PCT Pub. No.: WO2004/098214
PCT Pub. Date: Nov. 11, 2004

(65) Prior Publication Data
US 2006/0111103 A1 May 25, 2006

Related U.S. Application Data

(60) Provisional application No. 60/466,259, filed on Apr. 29, 2003, provisional application No. 60/470,228, filed on May 13, 2003.

(51) Int. Cl.
*H04Q 7/20* (2006.01)
(52) U.S. Cl. ...................................... 455/434; 455/432.1
(58) Field of Classification Search .................. 455/434, 455/514, 562.1, 432.1, 436, 515; 370/252, 370/349
See application file for complete search history.

(56) References Cited

U.S. PATENT DOCUMENTS

| | | | | |
|---|---|---|---|---|
| 6,332,077 B1* | 12/2001 | Wu et al. | ..................... | 455/432.1 |
| 6,917,804 B2* | 7/2005 | Takayama et al. | .......... | 455/432.1 |
| 6,940,843 B2* | 9/2005 | Goodall et al. | ............... | 370/338 |
| 6,957,067 B1* | 10/2005 | Iyer et al. | .................... | 455/435.1 |
| 7,224,679 B2* | 5/2007 | Solomon et al. | ............. | 370/338 |
| 7,359,989 B2* | 4/2008 | Orava et al. | ................... | 709/245 |
| 2002/0183061 A1* | 12/2002 | Moore | ......................... | 455/434 |
| 2003/0177267 A1* | 9/2003 | Orava et al. | ................... | 709/245 |
| 2003/0214905 A1* | 11/2003 | Solomon et al. | ............. | 370/229 |
| 2003/0221006 A1* | 11/2003 | Kuan et al. | .................... | 709/225 |
| 2004/0003285 A1* | 1/2004 | Whelan et al. | ................ | 713/201 |
| 2004/0063455 A1* | 4/2004 | Eran et al. | ..................... | 455/525 |
| 2004/0078566 A1* | 4/2004 | Barber et al. | ................. | 713/161 |
| 2004/0114535 A1* | 6/2004 | Hoffmann et al. | ............. | 370/252 |
| 2004/0203781 A1* | 10/2004 | Lefkowitz | ..................... | 455/436 |
| 2005/0249129 A1* | 11/2005 | Goodall et al. | ............... | 370/252 |
| 2006/0114826 A1* | 6/2006 | Brommer | ..................... | 370/230 |

* cited by examiner

*Primary Examiner* — Dwayne Bost
*Assistant Examiner* — Myron Wyche
(74) *Attorney, Agent, or Firm* — Haynes and Boone, LLP

(57) ABSTRACT

In a fast active scanning wireless network apparatus and method for quick determination of available access points (20), information about a candidate set of available access points (20) is obtained, and a candidate access point is identified from the candidate set. A mobile station (10) then queries the candidate access point with a probe request that designates the candidate access point as a sole responder. The probe request prevents other access points from contending for the medium of communication between the mobile station and the designated sole responder access point by excluding the attempt by other access points (20) to transmit probe responses. The apparatus and method thus increases the probability of a fast and successful probe request from the mobile station and subsequent response from the designated access point (20). The designated access point may also respond with a probe response of high priority, preventing intervention of communication.

5 Claims, 28 Drawing Sheets

| B0 | B1 | B2 | B3 | B4 | B5 | B6 | B7 |
|---|---|---|---|---|---|---|---|
| ESS | IBSS | CF Pollable | CF Poll Request | Privacy | Short Preamble | PBCC | Channel Agility |

| B8 | B9 | B10 | B11 | B12 | B13 | B14 | B15 |
|---|---|---|---|---|---|---|---|
| Reserved (0) | Reserved (0) | Reserved (0) | Reserved (0) | Radio Measurement | Reserved (0) | Reserved (0) | Reserved (0) |

FIG. 10

| B0 | B1 | B2 | B3 | B4 | B5 | B6 | B7 |
|---|---|---|---|---|---|---|---|
| ESS | IBSS | CF Pollable | CF Poll Request | Privacy | Short Preamble | PBCC | Channel Agility |

| B8 | B9 | B10 | B11 | B12 | B13 | B14 | B15 |
|---|---|---|---|---|---|---|---|
| Fast Active Scan | Reserved (0) | Reserved (0) | Reserved (0) | Radio Measurement | Reserved (0) | Reserved (0) | Reserved (0) |

FIG. 11

FAST ACTIVE SCANNING WIRELESS NETWORK APPARATUS AND METHOD

CROSS-REFERENCE TO RELATED APPLICATIONS

This application claims the benefit of Provisional Application Nos. 60/466,259, filed Apr. 29, 2003, and 60/470,228, filed May 13, 2003. The present application incorporates the disclosure of these provisional applications by reference.

FIELD OF THE INVENTION

This invention relates to a method, apparatus and system for fast active scanning of a wireless network, for instance, fast active scanning of those networks certified under one or more of the IEEE 802.11 wireless local area network (LAN) standards of interoperability, WPAN (Wireless Personal Area Networks), networks certified under one or more of the IEEE 802.16 and 802.16a standards, Bluetooth™ networks (including but not limited to IEEE 802.15.1 standard), HomeRF™ networks, HIPERLAN™ networks, IrDA™ networks and/or other wireless networks.

BACKGROUND OF THE INVENTION

Wireless networks generally include multiple access points for wireless connectivity to multiple mobile stations. Such connectivity allows a mobile station to communicate with any number of types of devices within a network, for instance, a mainframe, a server, a networked printer, another mobile station, and the like. Mobile stations determine which network to join by scanning for available channels. Scanning may be either an active or passive on one or more radio channels.

Passive scanning is carried out by a mobile station simply listening for signals broadcast from access points attached to the network. Active scanning is performed when a mobile station actively broadcasts a probe request signal or the like. A probe request signal is meant to solicit a probe response signal from available access points, based on which the mobile station is then able to gain access to the network. The interchange of the probe request and probe response signals is generally referred to as a "handshake."

When a mobile station is moving out of range of one access point and potentially into range of another access point, a handoff between those access points occurs. Conventionally, such handoffs have been time consuming. Different problems can result from either of handshake or handoff latency, ranging from interruption of communication all the way to lack of communication between a mobile station and a network's access points.

For instance, communications interruptions can result from Transfer Control Protocol ("TCP") congestion-avoidance algorithms kicking-in because of TCP-imposed time limits, causing decreased throughput between mobile stations and the network. Such latency can cause serious deterioration in voice transmission quality, for example, when handshake latency causes voice service interruption time to exceed 35 msec. As explained in greater detail below, handshake latency can easily exceed permissible limits, potentially causing a total loss of communication.

FIG. 1 is a diagrammatic example of a wireless local area network ("WLAN"), in which multiple mobile stations 10 wirelessly communicate with access points 20 via wireless signals 30. Access points 20 act as mediators between the mobile stations 10 and devices already connected to the network in either wired or wireless fashion (e.g., a server 40, a computer 50, a networked printer 60, or other mobile stations).

In order to communicate with the network, the mobile station 10 first senses the wireless medium 30 to determine if another mobile station is transmitting over a particular channel. If the channel is determined not to be busy, the mobile station proceeds with an attempt to communicate with the network on that channel.

The mobile station's attempt to communicate is orchestrated by, for example, a Distributed Coordination Function ("DCF") which may determine using techniques, such as Carrier Sense Multiple Access with Collision Avoidance ("CSMA/CA"), when any number of mobile stations are operating within the network, as well as when those mobile stations should be permitted to transmit and receive frames over the wireless medium.

Using one or more algorithms in accordance with the DCF, the CSMA/CA requires that a gap of a specified duration (otherwise called an Interframe Space, or "IFS") exists between all contiguous sequences of transmitted data. A transmitting device (whether an access point on the network or a mobile station) is required to ensure that the wireless medium is idle for a specific duration (the duration being specified by the type of IFS, as explained herein) prior to attempting to transmit. An IFS differs in length according to the priority of the frames being transmitted.

For example, a Short Interframe Space ("SIFS"), which is the shortest interframe gap, is employed when a transmitting device has seized a channel on the wireless medium and needs to keep the channel for the duration of the frame exchange to be performed. One such SIFS example is the acknowledgement frame (otherwise known as the "ACK signal" or "ACK frame"). Using the smallest gap between transmissions within the frame exchange sequence prevents other transmitting devices (whether access points or mobile stations) from attempting to use the seized channel because the other transmitting devices have to wait for the channel to be idle for a period of time that is longer than the SIFS period. Accordingly, the DCF and CSMA/CA provide priority to the current frame/data exchange sequence over attempts by other transmitting devices to transmit new data exchange sequences over the same channel on the wireless medium.

Another example of an interframe space is the Point Interframe Space (or "PIFS"). A PIFS is only used by transmitting devices operating under a Point Coordination Function ("PCF") to gain priority access to a channel on the wireless medium at the start of a contended free period. A PIFS gap is longer than a SIFS gap.

A Distributed Interframe Space ("DIFS"), which is longer than a PIFS gap, is used by transmitting devices operating under the Distributed Coordination Function ("DCF") and CSMA/CA to transmit data exchange frames and management frames. Management frames include such frames as probe requests and probe responses, which are used for communications handshakes between a mobile station and an access point.

When transmitting under the DCF, if a mobile station determines that a channel on the wireless medium is busy, the mobile station delays transmitting any new frames until the end of the current transmission. After this delay, or before attempting to transmit immediately following a successful transmission, the station selects a random backoff interval and decrements a backoff interval counter while the channel on the wireless medium is idle. The station reattempts transmission when the backoff interval counter reaches zero.

Further general parameters of the various IEEE 802.11 WLAN standards concern frame receptions/acknowledgments, physical and virtual carrier sense functions, and frame types. These parameters provide transport functions that ensure an intended receiver receives the total amount of bits and bytes in a data message correctly. These further parameters are generally discussed below with respect to FIGS. 2-7.

In FIG. 2, the basic field of a probe request signal may include the following: frame control, duration, destination address ("DA"), source address ("SA"), basic service set identification ("BSSID"), sequence control, service set identification ("SSID"), supported rates, and frame check sequence ("FCS"). Of these fields, the first six (frame control, duration, DA, SA, BSSID, and Sequence Control) are part of what is known as the Media Access Control (or "MAC") header for controlling transmission over the wireless medium. The next two fields (SSID and supported rates) constitute the probe request body. The final field (FCS) is used for error-detection.

The MAC header derives from the data link layer (otherwise known as the Media Access Control layer, or "MAC" layer) of the network. This layer provides a virtual carrier-sense mechanism (also known as a network allocation vector, or "NAV"), for maintaining a prediction of future traffic on the medium based on duration information that is available in the MAC headers of all transmitted information, with few exceptions.

The network may include a physical layer for providing a physical carrier-sense mechanism, which is based on energy detection in the wireless medium. In combination, the physical and virtual carrier-sense mechanisms help to determine the state of the wireless medium.

When attempting to communicate, mobile stations send probe request signals (including the MAC header) to scan the area for an existing network channel, and to solicit a probe response from a network access point ("AP"). Receiving APs use the probe request body (including the SSID and supported rates fields) to determine whether the mobile station can join the network. The mobile station desirably supports the data rates required by the AP, and indicates a desire to join any network or the network identified by the SSID.

Further, as noted above, general receiving rules under the 802.11 standards include a mobile station using a DA (destination address) field to perform address matching for receiving decisions. In the case of the DA field containing a group address (e.g., a broadcast address) when the field is other than a beacon field, the BSSID must be validated. That is, the BSSID field must have the same BSSID as the recipient. The BSSID field can be the broadcast BSSID if the field is a probe request. All transmitting devices (including APs and mobile stations) receiving data or management fields with a DA field other than a group address, respond to the received data or management fields with an acknowledgement signal (or "ACK" signal) transmitted with a SIFS deferral. However, if received fields have a group address in the DA field, ACK fields are not transmitted.

FIG. 3 is a diagram showing commonly incorporated bits that make up the control field of a probe request. Type bits (B2, B3) and subtype bits (B4-B7) of the control field are used for identification of the field type. Table 1 provides examples of valid type and subtype combinations as used in the field control field of the probe request signal.

TABLE 1

Examples of Valid Type and Subtype Combinations

| Type Value B3 B2 | Type description | Subtype value B7 B6 B5 B4 | Subtype description |
|---|---|---|---|
| 00 | Management | 0100 | Probe request |
| 00 | Management | 0101 | Probe response |
| 00 | Management | 1000 | Beacon |
| 00 | Management | 1101 | Action |
| 00 | Management | 1110-1111 | Reserved |
| 01 | Control | 1101 | Acknowledgement (ACK) |

FIG. 4 shows the basic fields of a probe response signal, including a MAC header (for instance those MAC header fields described above in relation to the probe request signal) and a frame body. The frame body includes a timestamp, a beacon interval, capability information, the SSID, supported rates, data set parameters ("DS" parameters), control frame parameters ("CF" parameters) and frame check sequence (FCS).

The probe response comprises fields for informing the mobile station transmitting the probe request of the network's characteristics, enabling the mobile station to match parameters so as to be able to join the network. Similarly to the fields of a probe request, type bits (B2, B3) and subtype bits (B4-B7) of the probe response's frame control field identify the frame type. Table 1 provides examples of valid type and subtype combinations as used in the frame control field of the probe response signal.

FIG. 5 shows the fields of the acknowledgement (or "ACK") signal. ACK signals are used to send positive acknowledgments in response to received frames. Similarly to the fields of a probe request and probe response, type bits (B2, B3) and subtype bits (B4-B7) of the ACK's frame control field identify the frame type. Table 1 provides examples of valid type and subtype combinations as used in the frame control field of the ACK signal.

FIG. 6 is a flowchart depicting the probe request portion of a handshake when scanning a network for available channels. The mobile station begins by discerning whether there are any unscanned channels in the network. If all channels have been scanned under the Distributed Coordination Function, the process is complete.

When there are unscanned channels, the mobile station transmits a probe request to a selected channel while simultaneously clearing and starting a probe timer clock (also known as "ProbeTimer"). The mobile station then senses the wireless medium to determine if the medium is busy until a minimum channel time is reached (the minimum channel time is also known as "MinChannelTime").

If the wireless medium is not busy during MinChannelTime, the channel is marked as scanned and the mobile station returns to querying whether there are any unscanned channels in the network. If all channels have been scanned under the Distributed Coordination Function, the process is complete. If any unscanned channels remain, the mobile station transmits another probe request to a selected channel while simultaneously clearing and starting the ProbeTimer clock. The mobile station then senses the wireless medium to determine if the medium is busy until MinChannelTime is reached.

If the wireless medium is busy during MinChannelTime, then the station waits until the ProbeTimer clock signal reaches a maximum channel time (also known as the "MaxChannelTime" signal). Additionally, if any unicast frame is received at the mobile station, the unicast frame is responded to with an acknowledgement signal (also known as an "ACK" signal) from the mobile station.

When the MaxChannelTime is reached, any received probe responses are processed, and the probed channel is marked as scanned. The process of FIG. 6 continues until all unscanned channels have been scanned.

FIG. 7 is a flowchart showing the procedure used by access points (APs) for sending out a probe response in answer to a received probe request signal. Proper probe request signals include a broadcast destination designated by the destination address ("DA") field, a broadcast BSSID, and probe request fields that satisfy the particular reception rules for the particular access points ("APs") receiving the probe request. On receiving probe request fields, the APs respond with a probe response only if the SSID in the probe request is the broadcast SSID, or if the SSID in the probe request matches the specific SSID of a particular AP. Probe response frames (for example, those response frames with the characteristics as described above in relation to FIG. 4) are sent as directed frames to the address of the mobile station that generated the probe request. On receipt, the mobile station acknowledges them with an ACK signal.

If a probe response is not acknowledged with an ACK signal, the probe response is retransmitted for a predetermined number of attempts (the limit on number of retransmission attempts is also known as the RetransmissionLimit). The probe response follows the normal rules of the DCF (as previously described). APs transmitting a probe response are continuously maintained in an awake state, and respond to all probe requests meeting the above-noted criteria.

In FIG. 7, a counter (for counting the number of attempts before an ACK signal is received in response to a transmitted probe response) is cleared at the beginning of the process. Then, received probe requests are checked to see whether the request's SSID is the broadcast SSID, or whether the SSID of the probe request matches the AP's SSID. If neither of these criteria is met, a probe response is not sent, and the process ends. If either of these criteria is met, the counter is checked to see whether the retransmission limit is less than the predetermined retransmission limit. If the retransmission limit has been reached, an additional probe response is not sent, and the process ends.

If the retransmission limit has not been reached, then a probe response is sent under the normal rules of DCF. The AP then waits for reception of an acknowledgement ("ACK") signal. If the ACK signal is received before an acknowledgement timeout ("AckTimeOut"), then the process is complete. If an ACK signal is not received prior to the AckTimeOut timing out, the counter is incremented and the process begins again with the comparison of the retransmission limit to the counter value, as described above, until the process has completed with either the RetransmissionLimit being reached, or reception of an ACK signal before the AckTimeOut timing out.

FIG. 8 shows an example of an overall handshake between a mobile station and an AP, from initial probe request to subsequent probe response and acknowledgement signal transmission. In FIG. 8, a first mobile station ("STA 1") is scanning for availability of a specific channel on a network, for example, channel 1. STA 1 contends for the medium of channel 1 under the basic access rules of DCF by transmitting a probe request signal with a broadcast destination address and broadcast BSSID. Since the probe request has been broadcast, any APs in the physical transmission area of the probe request that are using channel 1 will receive the probe request signal and will attempt to respond with their own probe response signals. For instance, AP 1 and AP 2 shown in FIG. 8 will each attempt to respond with a probe response.

When AP 1 and AP 2 transmit their own probe responses, AP 1 and AP 2 contend for the medium under the basic access rules of the DCF, as explained above. Further, AP 1 and AP 2 are also contending with other transmitting devices (e.g., STA 2 as shown in FIG. 8) attempting to send their own frames under the DCF. Frames thus colliding are known to potentially cancel one another out, or to cancel one or the other out.

A mobile station that has sent a probe request frame determines the availability of the APs based on the medium status as reflected by the receipt of probe responses within the minimum channel time (also known as the MinChannelTime). A probe timer (also known as "ProbTimer") tracks the time for response to the probe request. If the wireless medium is idle until the ProbTimer reaches MinChannelTime, the mobile station considers that no AP is available, as reflected by cases 5 and 7 in Table 2.

TABLE 2

Determination of AP Availability Through Probing

| | Availability of AP | Receipt of Probe Request | Medium busy during MinChannelTime | Transmission of Probe Response during MaxChannelTime | Receipt of Probe Response | Determined Availability of AP | Judgment Correctness |
|---|---|---|---|---|---|---|---|
| Case 1 | ○ | ○ | ○ | ○ | ○ | ○ | ○ |
| Case 2 | ○ | ○ | ○ | ○ | X | X | X |
| Case 3 | ○ | ○ | ○ | X | X | X | X |
| Case 4 | ○ | X | ○ | X | X | X | X |
| Case 5 | ○ | ○/X | X | ○/X | X | X | X |
| Case 6 | X | X | ○ | X | X | X | ○ |
| Case 7 | X | X | X | X | X | X | ○ |

Conversely, if the wireless medium is not idle as determined by receipt of a probe response within the MinChannelTime period, the AP having sent the probe response is considered as available to serve the mobile station (for instance, case 1 of Table 2). Otherwise (as shown by cases 2, 3, 4, and 6 of Table 2), the mobile station considers that no APs are available. However, the judgment that no AP is available is not always correct, as explained below.

In Table 2, correct judgment is reflected by cases 1, 6 and 7. In case 1, the AP is available and successful receipt of a probe response signal verifies this. In case 6, no AP is available. That is, either the AP or mobile station are out of the physical transmission area and either the probe request or probe response cannot be delivered to the recipient. This fact is derived from a failure to receive a probe response within the time limit of MaxChannelTime.

In case 7, no AP is available. That is, either the AP or mobile station are out of the physical transmission area and there fails to be another active station transmitting in the vicinity. MinChannelTime thus expires without the mobile station detecting the wireless medium as busy.

Further in Table 2, incorrect judgment is reflected in cases 2, 3, 4 and 5. In case 2, the probe request was received correctly, and the probe response was sent before expiration of MaxChannelTime. However, the mobile station could not receive the probe request correctly. Reasons why this may occur include the probe response signal colliding with frame transmissions of other stations or other APs. In case 3, the probe request has also been received correctly, but the probe response signal cannot be sent prior to MaxChannelTime expiring. This may be due to the AP not being able to get a timely transmission opportunity for a probe response, or because of medium contention with other stations or APs, or as a result of other data frames that precede the probe response in the transmission queue. In case 4, the AP could not receive the probe request correctly. The probe request could have collided with the frame transmissions of other mobile stations or APs. In case 5, MinChannelTime has been set to an improper value that is smaller than is actually required.

In cases 2 through 5 of Table 2, the decision that no APs are available is incorrect. A scanning mobile station in conventional scanning mode is thus provided three options for handling these problems: (1) use of a larger MinChannelTime, (2) use of a larger MaxChannelTime, or (3) retransmission of the probe request signal.

In any of the above-three options, an increase in scanning time is traded for the associated increase in accuracy. The problem of handshake latency resulting from any of the above-three options is only multiplied by the plurality of channels to be scanned, as there typically is more than one channel to be scanned in a wireless network. Conventional methods are accordingly extremely inefficient in terms of scanning time, the result being high handshake latency. As explained above, problems resulting from high handshake latency vary from mere interruption of communication all the way to utter non-communication between a mobile station and a network's access points.

SUMMARY OF THE INVENTION

Therefore, one feature of the present invention provides a method, network and system for fast active scanning of a wireless network, including collecting candidate access point information that differentiates between candidate access points which are most likely to provide communication with wireless stations in the network and candidate access points which are not; and transmitting the candidate access point information. It is also a feature of the present invention to select, from the candidate access point information, the candidate access points that have been differentiated as most likely to provide communication; and transmitting the differentiated candidate access point information.

It is a further feature of the present invention to scan, with a wireless station, the candidate access points that have been differentiated as most likely to provide communication. It is yet a further feature of the present invention that the scanning of candidate access points includes the wireless station transmitting a probe request for a specified candidate access point chosen from among the candidate access points differentiated as most likely to provide communication with the network.

Additional features of the present invention are evident from the associated drawings and in the Detailed Description of Embodiments section, below.

BRIEF DESCRIPTION OF THE DRAWINGS

The invention, both as to its organization and manner of operation, may be further understood by reference to the drawings that include FIGS. 1-27, taken in connection with the following detailed description.

FIG. 10 depicts bit-frame information for the scanning capability of a typical AP;

FIG. 11 depicts an AP with a bit assignment for B8 that indicates that the AP is provided with the fast active scanning of the instant invention;

DETAILED DESCRIPTION OF EMBODIMENTS

The following description of illustrative non-limiting embodiments of the invention discloses specific configurations and components. However, the embodiments are merely examples of the present invention, and thus, the specific features described below are merely used to describe such embodiments and to provide an overall understanding of the present invention.

Accordingly, skilled artisans readily recognize that the present invention is not limited to the specific embodiments described below. Furthermore, the descriptions of various configurations and components of the present invention that are known to one skilled in the art are omitted for the sake of clarity and brevity.

Further, while the following embodiments employ the IEEE 802.11 standards by way of example, the present invention may be applied to different wireless networks, including but not limited to those enumerated above.

The present invention reduces scanning time and handshake latency by making handshakes less susceptible to misjudgment without increasing the number of times a probe request is retransmitted and also without increasing either of MinChannelTime or MaxChannelTime. Indeed the present invention is capable of reducing handshake time when there is no designated AP by allowing the use of a small MinChannelTime.

Figure 9:
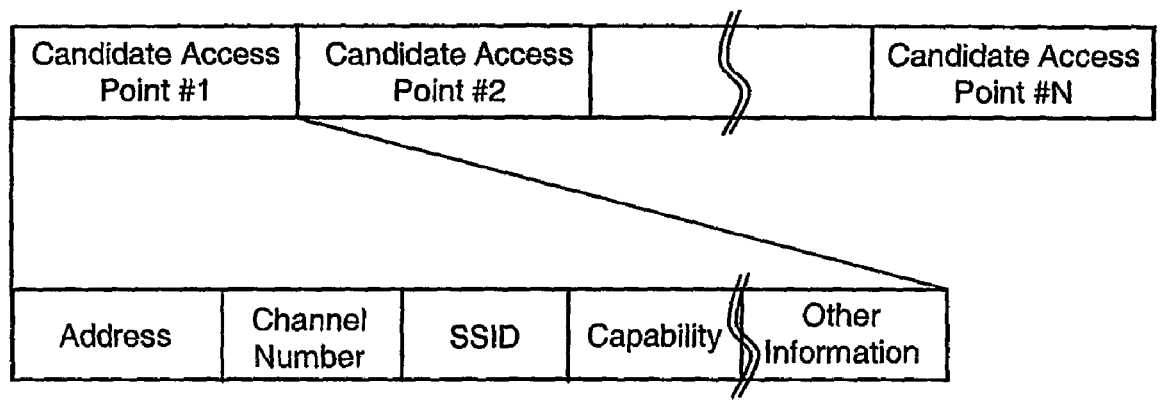
FIG. 9 depicts fields of candidate access point ("CAP") information.

In brief, the instant invention incorporates information on neighboring APs to focus a probe request to a specific AP, chosen from a list of candidate access points ("CAPs"). CAPs are determined by providing the mobile station with prior knowledge of the likely state of existing APs. FIG. 9 is an example of the information provided to mobile stations concerning candidate access points.

CAP information includes respective addresses and operational channel numbers for each CAP provided in the list. Further, if CAPs of multiple extended service sets (ESSs) are listed, then the SSID of the respective CAP may be included to facilitate appropriate CAP selection by the mobile station. Additionally, if a plurality of methods are deployed for active scanning, information on the CAPs' scanning capability may also be included to facilitate the selection of a scanning method by the mobile station to match the CAPs' capabilities.

FIG. 10 depicts bit-frame information of the scanning capability of a typical AP. The depicted bit-frame information shows assignment of the capability information field. These frames may be transmitted in beacon or probe response signals, or in other signals.

FIG. 11 depicts an AP with a bit assignment for B8 that indicates the AP is provided with the fast active scanning of the instant invention. Any reserved bit space could be used to denote fast active scanning. The depicted use of B8 in FIG. 11 is purely an example. Furthermore, more than one reserved bit could be used to indicate the specific scanning capability.

Information on CAPs can be collected and delivered to the mobile station(s) in any of various fashions. One such method is offline collection by an operator, in which network providers or operators can collect information by examining coverage of each AP offline. This method of collection of information may be extracted/implemented during the original planning for all APs.

Another method is real time collection by all APs, using reassociation messaging, in which mobile stations that make a handshake between two APs are recommended to send a reassociation frame containing information of prior APs to subsequent APs. Subsequent APs are then required to send a move-notify message containing information about themselves to prior APs. Through such message exchanges, APs can themselves collect information on CAPs.

Another real time collection method for information on CAPs would be scan reporting, in which mobile stations that have finished scanning can be requested by the current AP to send a scanning results report of the previous scan to the current AP.

Figure 12:
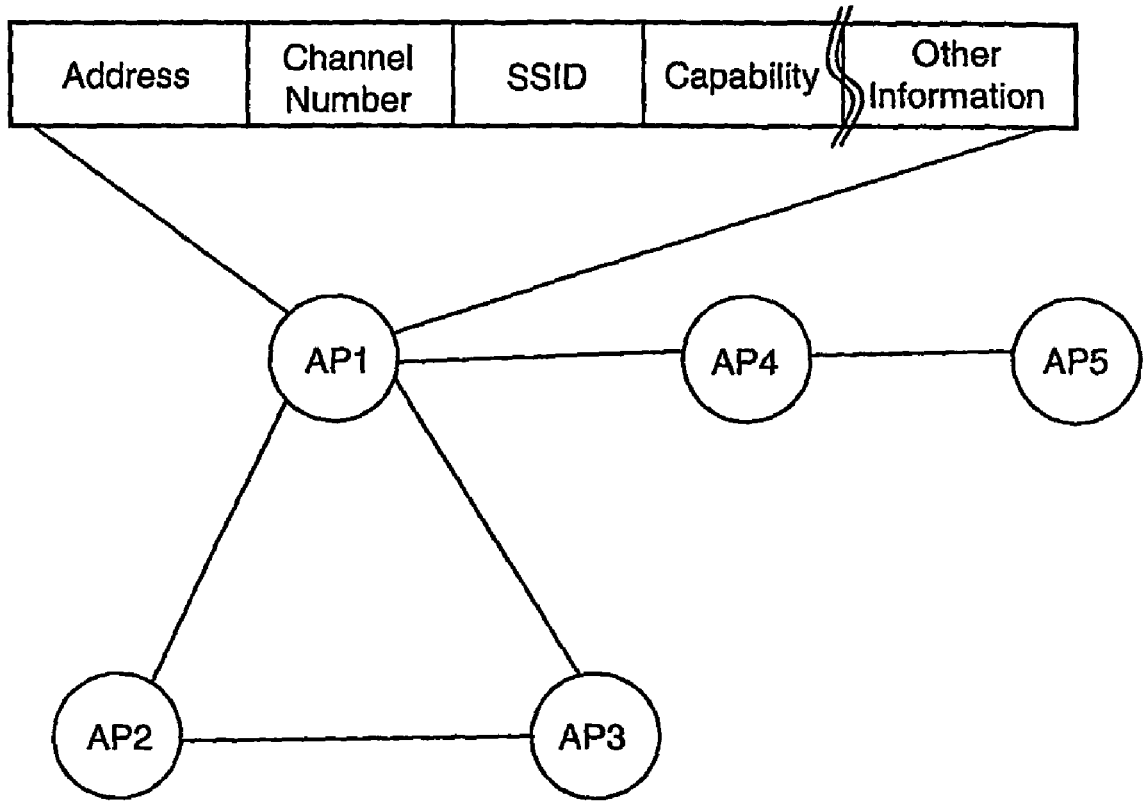
FIG. 12 depicts a neighborhood graph showing the relationship of each AP to the other.

Because information collected by the two above-noted methods (reassociation messaging and scan reporting) may be constrained within the boundaries of direct-neighbor APs, a corresponding real time method for collecting CAP information is information exchange among existing APs. This method could be incorporated with either or both of reassociation messaging and scan reporting to exchange information among all APs in a network. FIG. 12 depicts how exchanging information among all APs results in a neighborhood graph of the APs that shows their relationship to each other.

A further real time collection method could be the collection of CAP information by a mobile station. That is, results of prior scans can be utilized for subsequent scans. For instance, when beginning an initial scan, mobile stations could use the above-noted information on CAPs as provided by an offline operation or as provided by real time collection by APs. Another option would be to simply use conventional scanning as an initial scanning method, and then to switch to a scanning method of the instant invention as provided herein.

If CAP information is collected by entities other than a mobile station, the information needs to be delivered to the station. Information may be delivered in any of several ways, as follows, by way of example.

Delivery of CAP information may be performed via beacon or probe response for an existing AP to a receiving mobile station. Sending the CAP information in a beacon signal may result in a relatively long lag time as a beacon signal is typically sent periodically. Additionally, a mobile station receiving a probe response is generally more interested in the availability of the AP itself (rather than neighboring APs), so containing the CAP information in a probe response may result in unnecessary overhead.

Delivery of CAP information may also be done by request and response. That is, only when a mobile station requests the CAP information will it be delivered. The CAP information may be sent to the specific requesting mobile station, or to the entire network.

Delivery of CAP information may also be performed by simply uploading the information to each station during initial setup.

Collection and delivery of CAP information may be performed in any of the above-described methods, or in combinations of the above-described methods, or via other methods. Further, the following embodiments may be combined in various ways.

In the following embodiments, the instant invention employs the CAP information that has been collected and delivered (as described above) to the mobile station attempting to communicate with the network. Accordingly, mobile stations attempting to communicate with the network are therefore enabled to tune to the operational channel of a specific CAP in practicing the various embodiments.

Embodiments of the invention are enumerated below. The numbering does not imply any order of importance. All of these embodiments depict various aspects of the invention.

I. First Embodiment

In a first embodiment, the mobile station uses the CAP information that has been collected and delivered to the mobile station to differentiate between those access points that are most likely to provide communication (CAPs) and those access points which are not likely to provide communication (e.g., busy or otherwise non-communicative APs). This allows the MaxChannelTime to be set to less than in conventional scanning methods.

Figure 6:
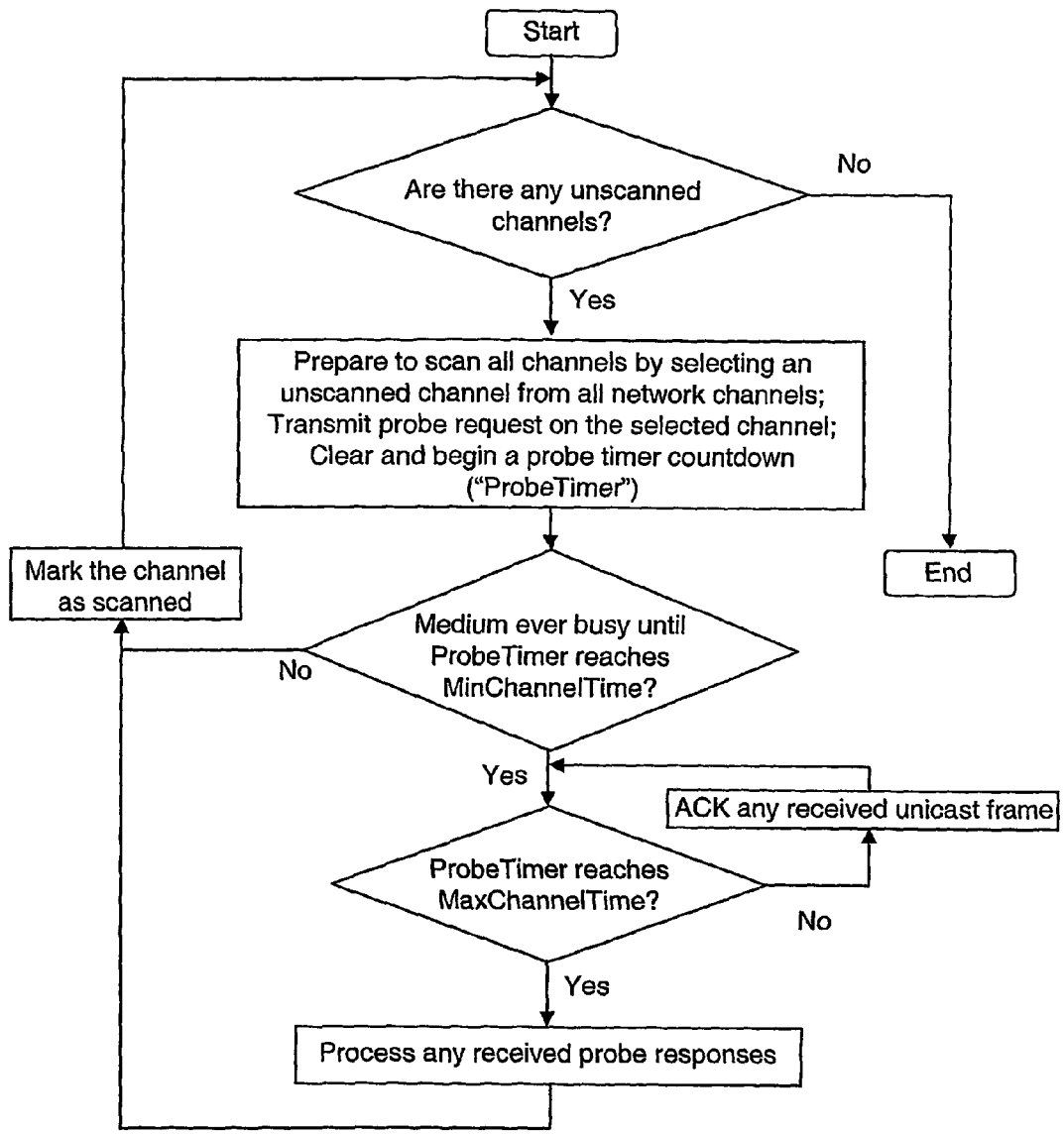
FIG. 6 is a flowchart which shows the basic procedure of sending probe request signals.
Figure 7:
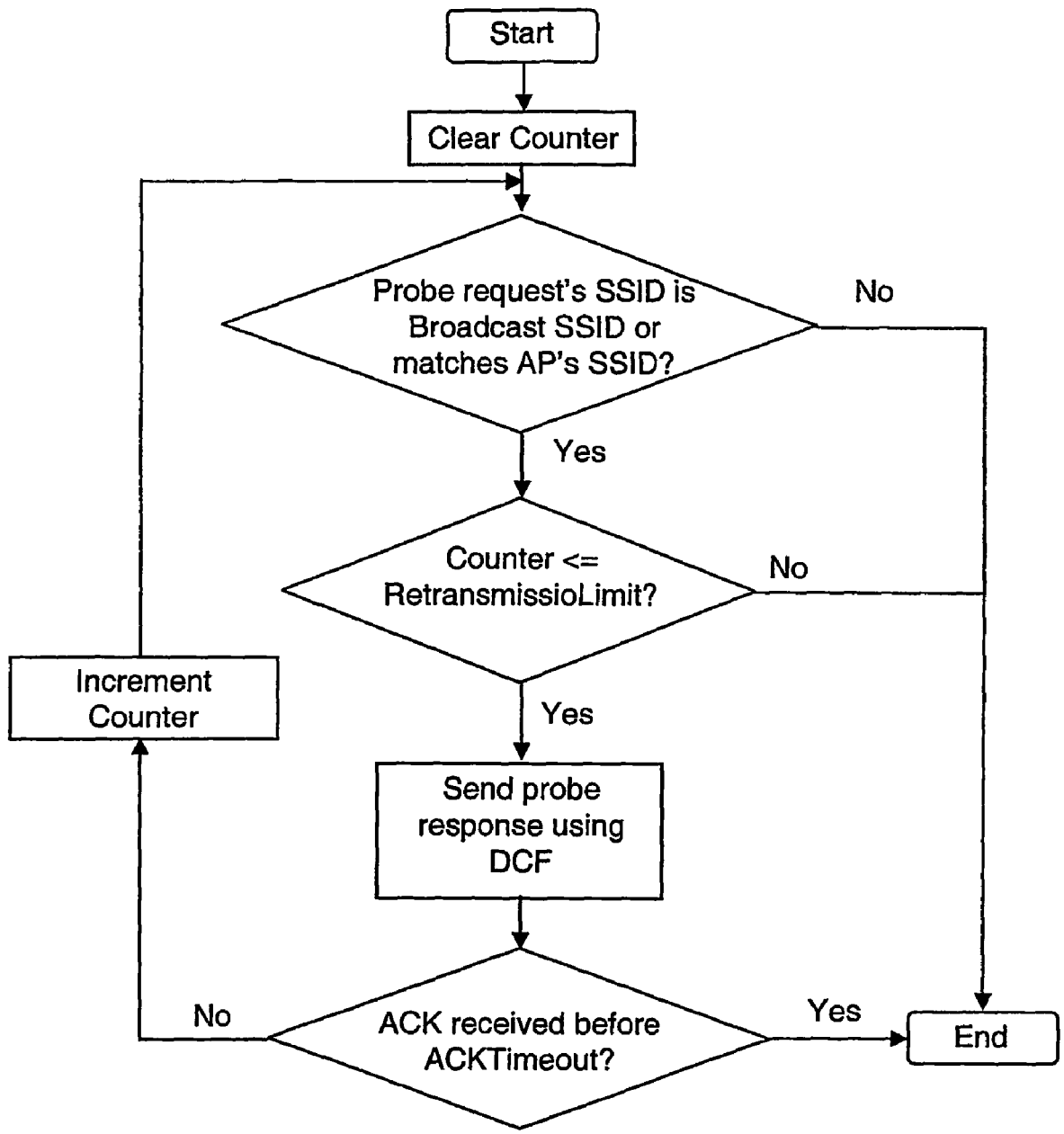
FIG. 7 is a flowchart which shows the basic procedure of sending probe response signals.
Figure 8:
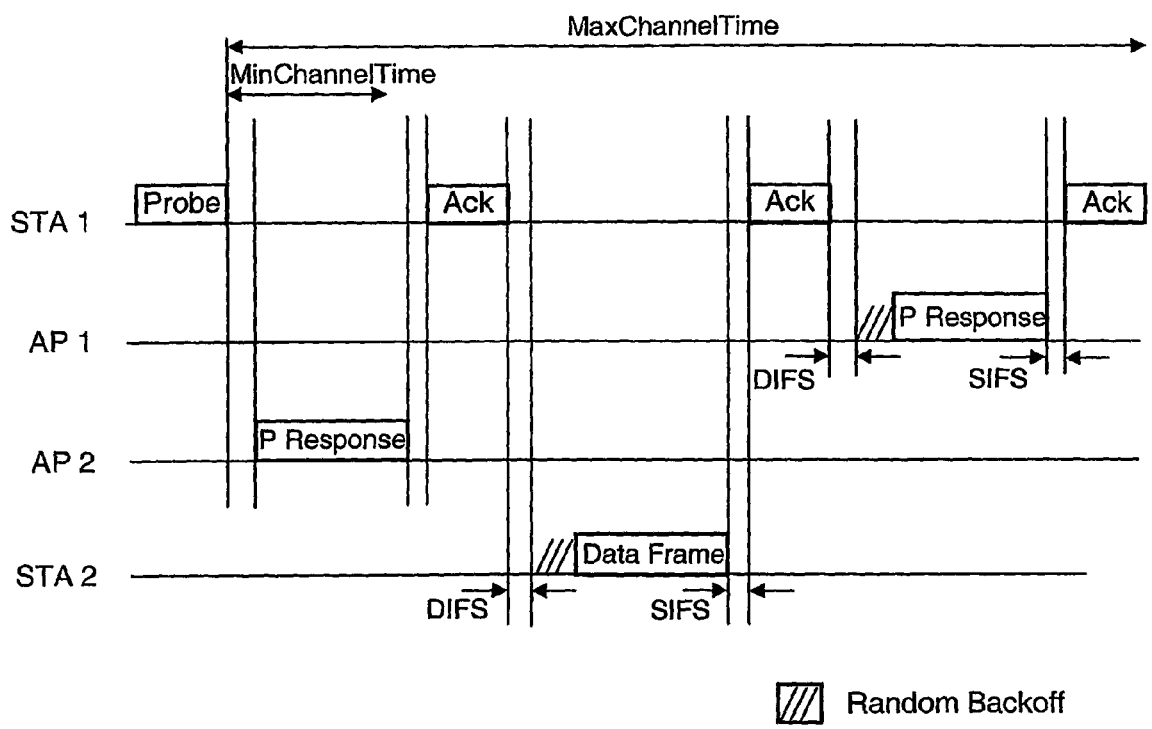
FIG. 8 is a temporal illustration showing a handshake between a mobile station and an access point on a wireless network, including sending a probe request, a probe response and acknowledgement signals.

In comparison to conventional scanning techniques (e.g., the scanning technique disclosed in FIG. 6), the process of the first embodiment involves the directed scanning of specific APs (candidate access points) vis-à-vis the scanning of network channels (as disclosed by FIG. 6, for instance).

The first embodiment accomplishes directed scanning of available CAPs through utilization of the provided CAP information, using the received CAP information to enter specific access point identification information in the fields of probe requests for individual CAPs. This may be done by entering the address of a specific CAP in the BSSID field along with the SSID of the CAP in the SSID field of the probe request signal. Alternatively, this may also be done by inserting the address of the CAP in the BSSID field along with the broadcast SSID in the SSID field of the probe request signal. Table 3, below, reflects possibilities in specifying permissible field values for the probe request signal of the first embodiment.

TABLE 3

Permissible Field Values for the Probe Request in the First Embodiment

| | DA | BSSID | SSID |
|---|---|---|---|
| Type 1 | Broadcast address | Address of the AP | SSID of the AP |
| Type 2 | Broadcast address | Address of the AP | Broadcast SSID |

Figure 14:
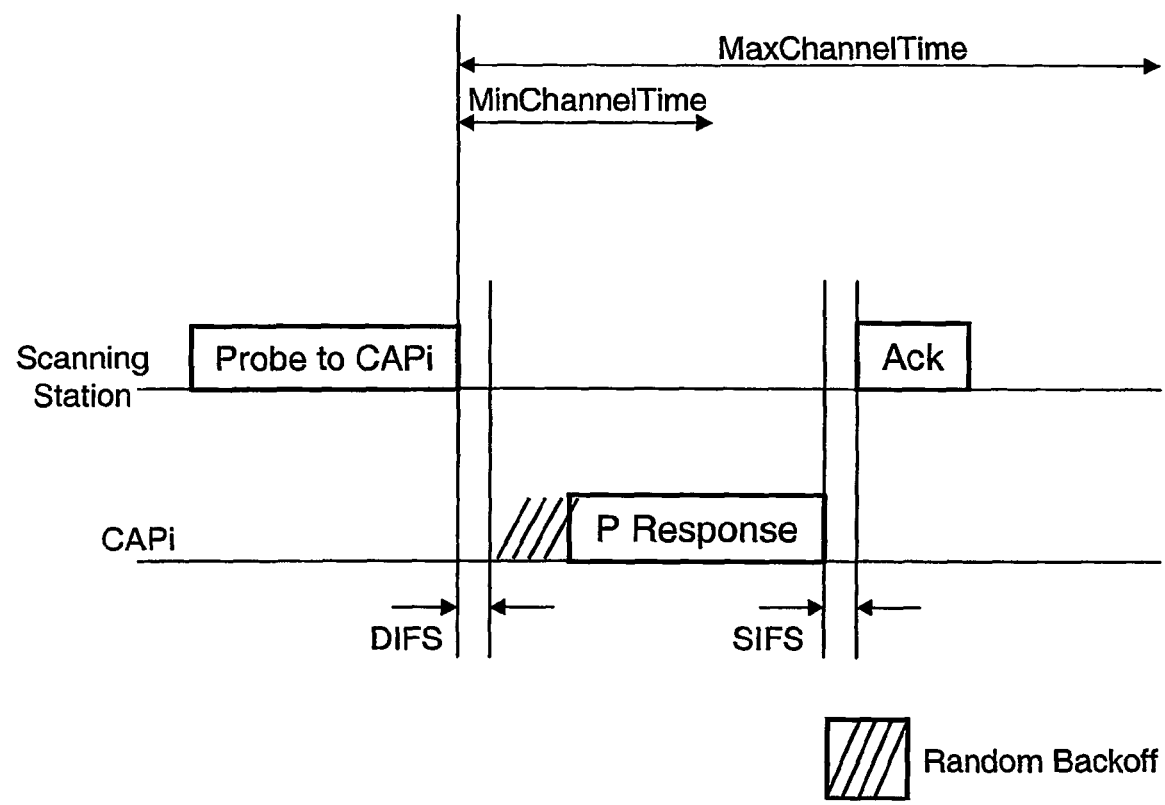
FIG. 14 depicts an exchange of frames in a handshake according to the first embodiment.

In this embodiment, the CAP that has received a probe request signal will respond with a probe response only if the SSID in the probe request is the broadcast SSID or if the SSID field matches the specific SSID of the CAP. Probe response frames will be sent as directed frames to the address of the mobile station that generated the probe request and will be subsequently acknowledged by the mobile station. This exchange of frames is illustrated in FIG. 14. Notably, only the CAP that has the address of the BSSID field will be able to respond to the probe request frame. Other APs, although operating on the same channel or having the same SSID, will not respond to the probe request because the probe request does not designate them as a responder.

Figure 13:
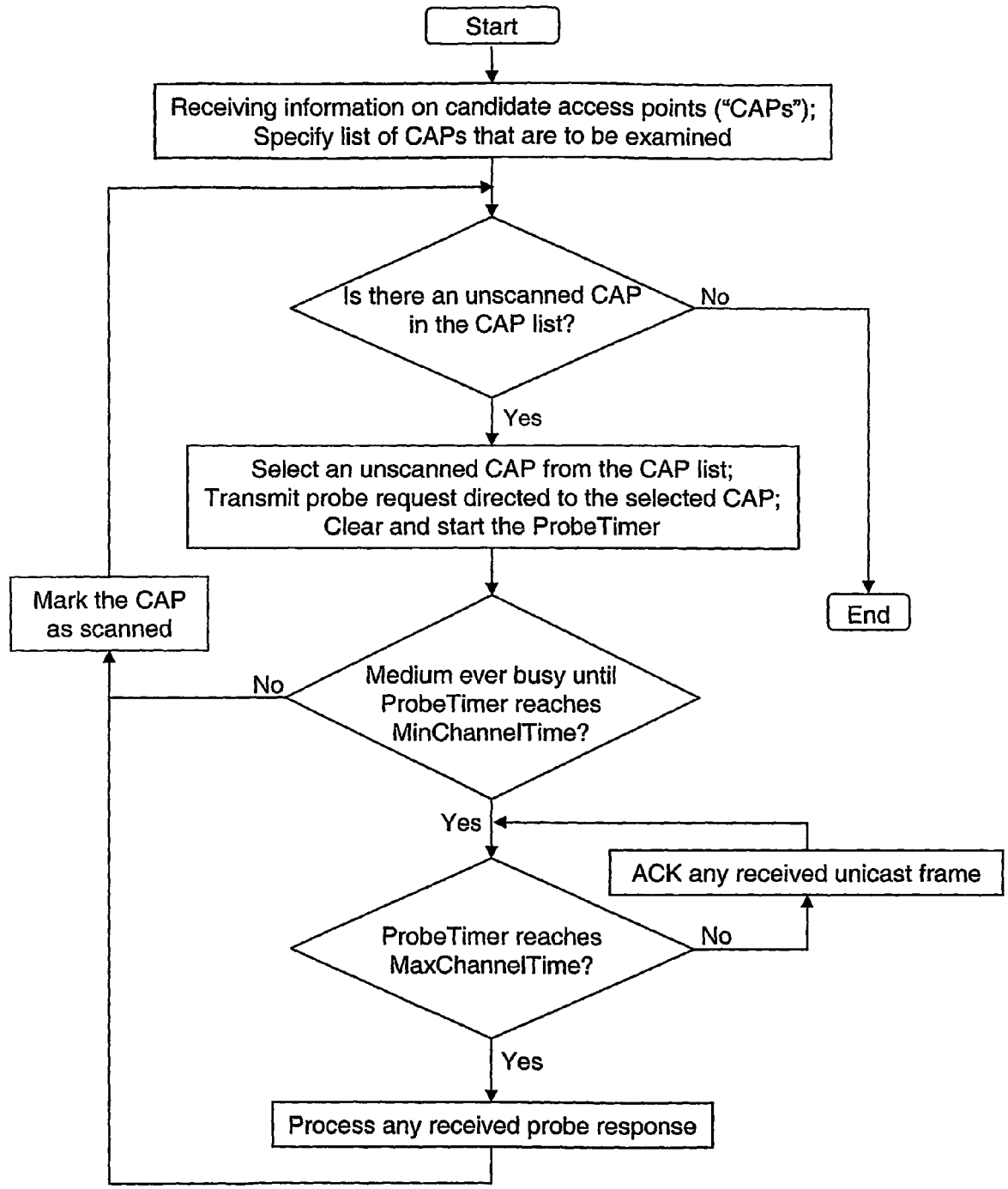
FIG. 13 is a flowchart that depicts a first embodiment of the instant invention.

FIG. 13 is a flowchart that depicts the first embodiment. In FIG. 13, the mobile station begins by receiving CAPs information (wherein the CAPs information differentiates between those access points most likely to enable communication and those access points that are not) and then specifying a list of CAPS that are to be examined based on those most likely to enable communication.

Next, the mobile station discerns, from the list of CAPs to be examined, if any unscanned CAPs are present. If all CAPs have been scanned under the Distributed Coordination Function, the process is complete.

When there are unscanned CAPs, the mobile station transmits a probe request to a selected CAP while simultaneously clearing and starting a probe timer clock (also known as "ProbeTimer"). The mobile station then senses the wireless medium to determine if the medium is busy until a minimum channel time is reached (the minimum channel time is also known as "MinChannelTime").

If the wireless medium is not busy during MinChannelTime, the CAP is marked as scanned and the mobile station returns to querying whether there are any unscanned CAPs in the network. If all CAPs have been scanned under the Distributed Coordination Function, the process is then complete.

If any unscanned CAPs remain, the mobile station transmits another probe request to a selected CAP while simultaneously clearing and starting the ProbeTimer clock. The mobile station then senses the wireless medium to determine if the medium is busy until MinChannelTime is reached. If the wireless medium is busy during MinChannelTime, then the station waits until the ProbeTimer reaches a maximum channel time (also known as the "MaxChannelTime" signal). Additionally, if any unicast frame is received, it is responded to with an acknowledgement signal (also known as an "ACK" signal) from the mobile station.

When the MaxChannelTime is reached, any received probe responses ate processed, and the probed CAP is marked as scanned. The process of FIG. 13 continues until all unscanned CAPs have been scanned.

FIG. 14 depicts a temporal exchange of frames in the first embodiment between a mobile station and a CAP. A scanning mobile station sends a probe request signal to a CAP. After the DIFS period and a random backoff interval, the CAP responds with a probe response signal. After a subsequent SIFS period, the mobile station confirms receipt of the probe response with an acknowledgement ("ACK") signal.

II. Second Embodiment

In a second embodiment, MinChannelTime and MaxChannelTime can both be set to less than required for conventional scanning systems, for the reasons explained herein. The mobile station of the second embodiment can learn of the actual availability of a CAP not only through the receipt of a probe response signal from the CAP, but also, if the mobile station is only interested in knowing if the CAP is available, through receipt of an ACK signal. Accordingly, a probe response is not necessary.

That is, instead of (or in addition to) a probe response, the mobile station may be alerted to the availability of a CAP through receipt of an ACK signal sent from the CAP. Conversely, if the mobile station is interested in more information than just the availability of the CAP, it may wait for a probe response signal to be transmitted subsequent to the transmission of an ACK signal from the CAP. Otherwise, the mobile station may proceed to the scanning of other CAPs without waiting for a probe response.

Figure 15:
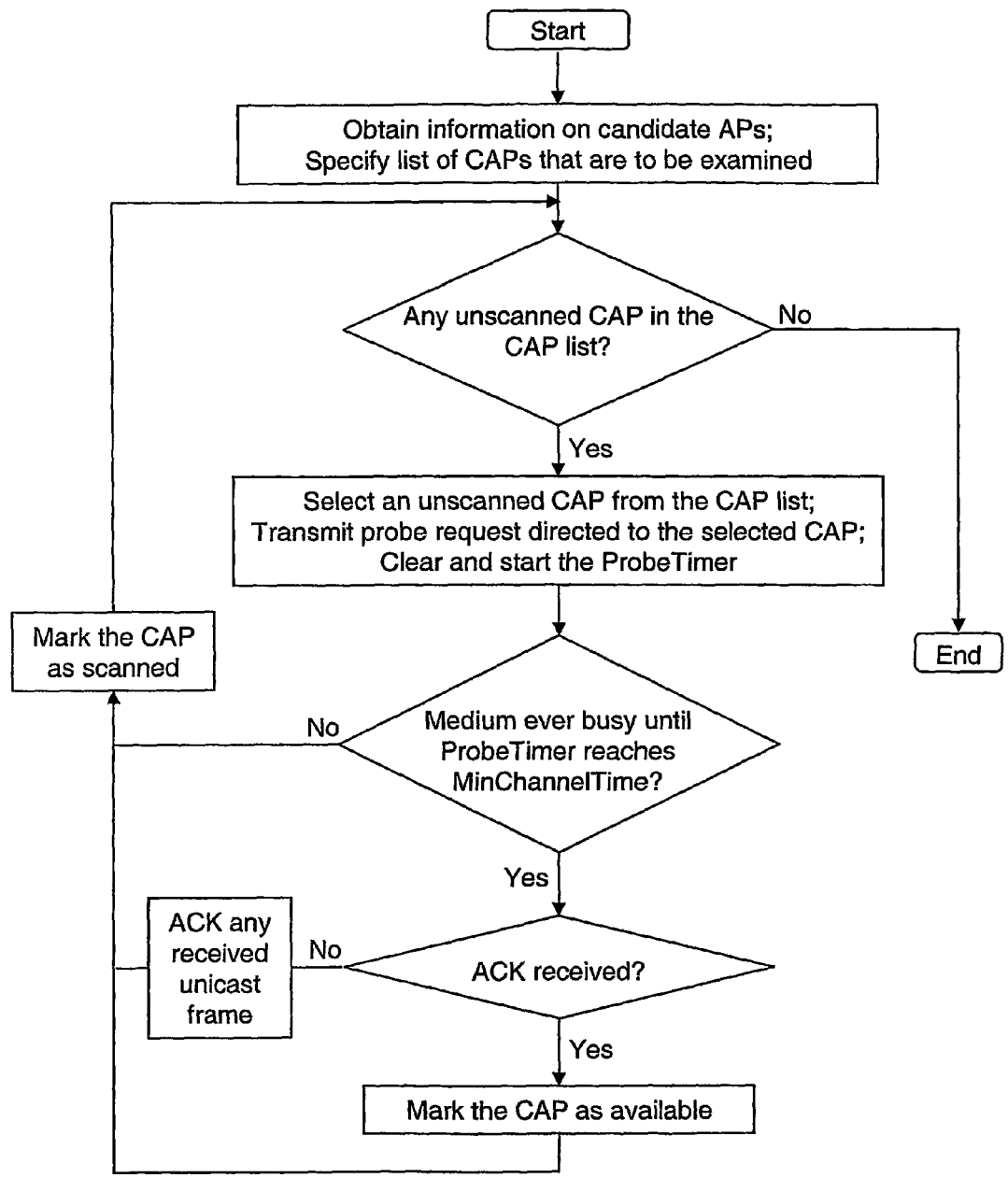
FIG. 15 is a flowchart that depicts a second embodiment of the instant invention.

The procedure of the second embodiment of the invention is shown by the flowchart of FIG. 15. As FIG. 15 is similar in nature to FIG. 13, similar features will not be reiterated.

FIG. 15 shows that for an ACK signal received in response to a transmitted probe request, the CAP in question is marked as scanned and available, and then either the remaining CAPs to be scanned are scanned or the process is at an end because all CAPs have been scanned.

Conversely, if an ACK signal is not received in response to a probe request, the CAP is simply marked as scanned and then either the remaining CAPs to be scanned are scanned or the process is at an end because all CAPs have been scanned.

The second embodiment accomplishes directed scanning of available CAPs using the provided CAP information to enter specific access point identification information in the frames of probe requests for individual CAPs. This may be done by entering the address of a specific CAP in the DA field in the probe request signal. Either of the address of a specific CAP or the broadcast BSSID is entered in the BSSID field, along with either of the SSID of the CAP or the broadcast SSID in the SSID field of the probe request signal. Table 4, below, reflects possibilities in specifying permissible field values for the probe request signal of the second embodiment.

TABLE 4

Permissible Field Values for the Probe Request in Embodiment 2

| | DA | BSSID | SSID |
|---|---|---|---|
| Type 1 | Address of the AP | Address of the AP | SSID of the AP |
| Type 2 | Address of the AP | Broadcast BSSID | SSID of the AP |
| Type 3 | Address of the AP | Address of the AP | Broadcast BSSID |
| Type 4 | Address of the AP | Broadcast BSSID | Broadcast BSSID |

Frame exchange in the second embodiment is altered so that transmitted probe request signals are responded to with an ACK signal. While different from conventional scanning methods, the second embodiment still complies with the general rules for IEEE 802.11 acknowledgements, since the probe request maintains non-group destination address assignment, as shown in Table 4, above. Notably, in the second embodiment (and additionally in the first embodiment) only the CAP that has the address of the DA field will be able to respond to the probe request frame. Other APs, although operating on the same channel or having the same SSID, will not respond to the probe request because the probe request does not designate them as a responder.

Figure 16:
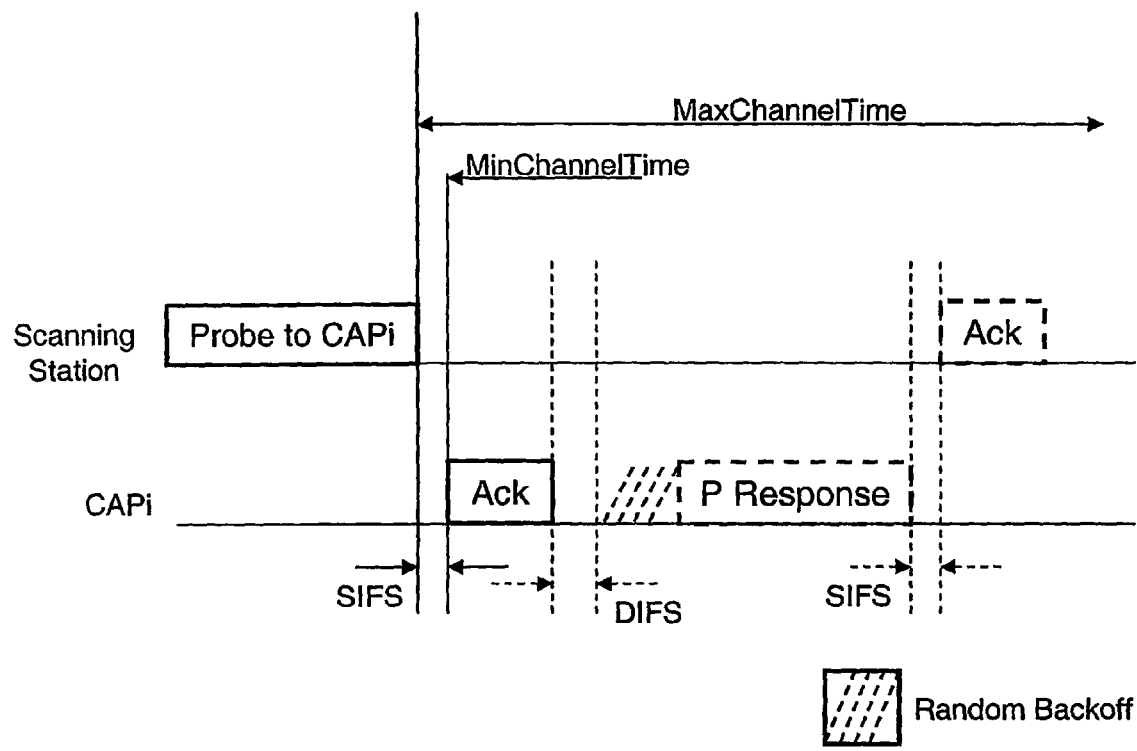
FIG. 16 depicts an exchange of frames in a handshake according to the second embodiment.

An entire frame exchange of the second embodiment is illustrated by FIG. 16. As shown in the figure, a probe request is sent to a specific CAP, and the designated CAP responds with an ACK signal. It should be understood that the subsequent probe response and ACK depicted in dotted line as shown in the figure is purely an optional feature of the second embodiment.

Figure 17:
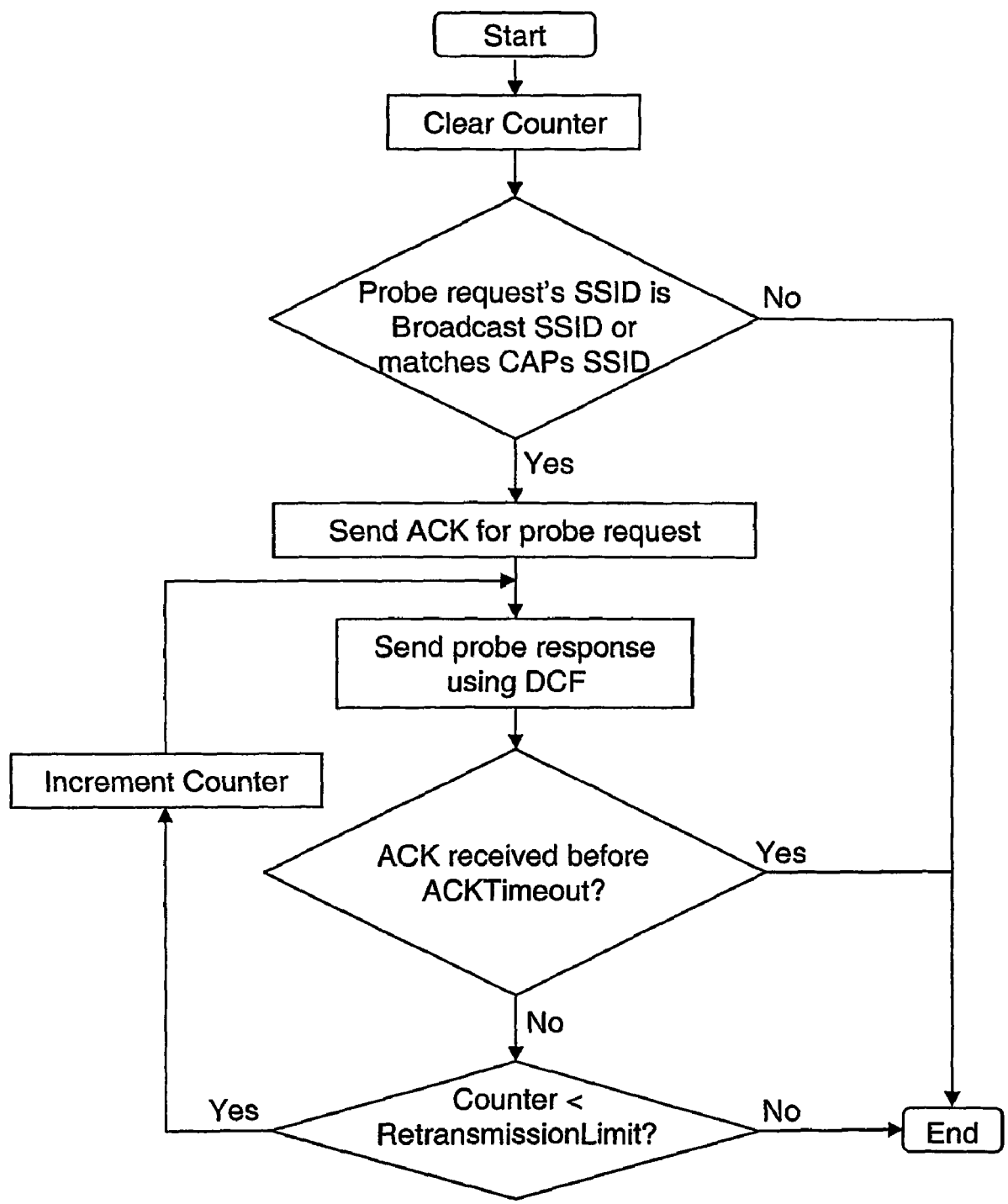
FIG. 17 is a flowchart showing the procedure that a CAP follows in the second embodiment after reception of a probe request.

FIG. 17 is a flowchart showing the procedure that a CAP follows in the second embodiment after reception of a frame request. In the figure, CAPs that receive probe requests that are in compliance with Table 4 respond with an ACK signal. As an optional feature, if the SSID in the probe request is the broadcast SSID or if the SSID matches the specific SSID of the CAP, then the CAP initiates transmission of a probe response as directed frames to the address of the mobile station that generated the probe request. The probe response is sent using the normal frame transmission rules of the DCF.

In the second embodiment, MinChannelTime can be set to a value not much greater than the SIFS value, since an ACK signal is sent in response to the probe request immediately after the SIFS interval.

III. Third Embodiment

Figure 18:
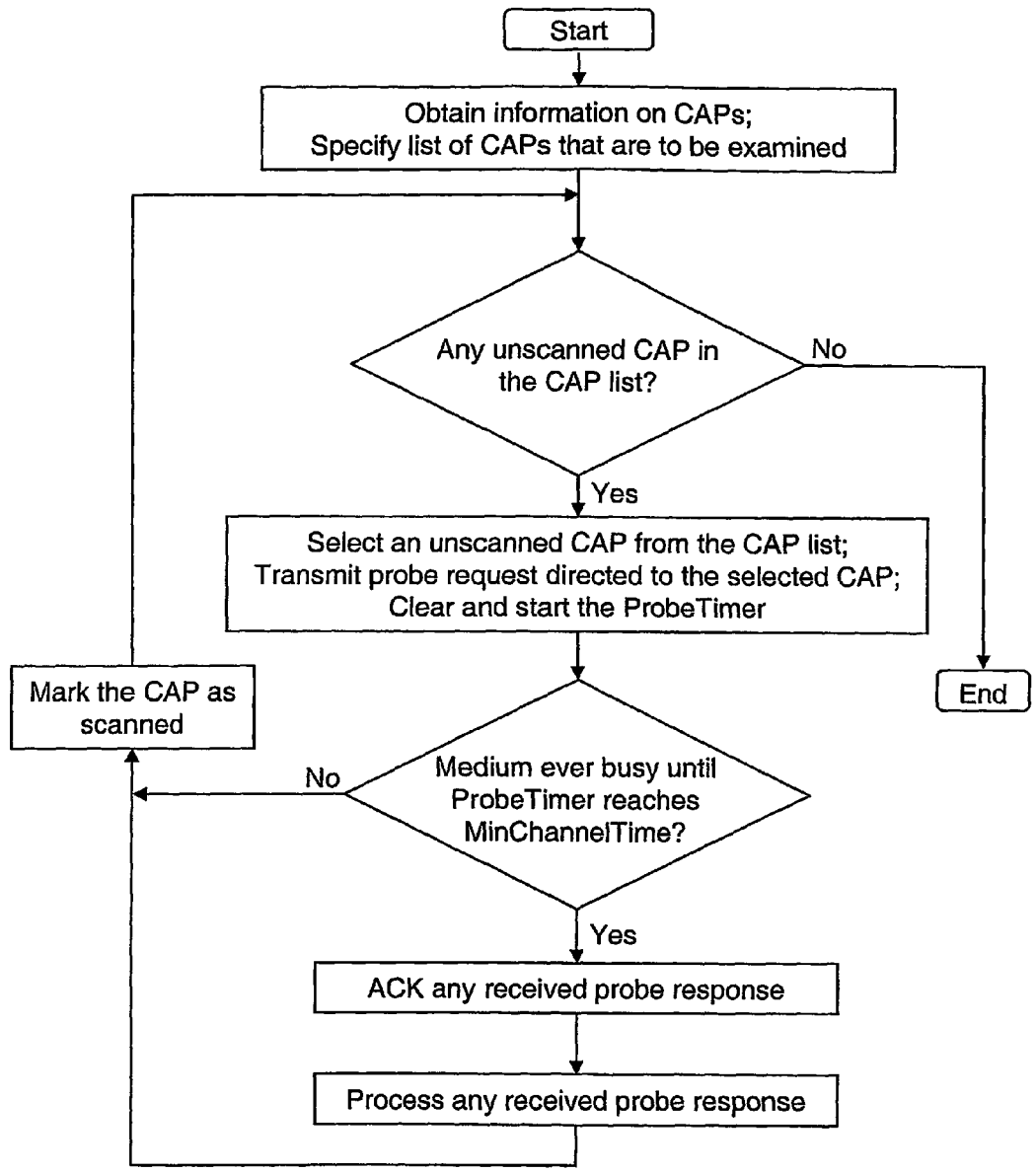
FIG. 18 is a flowchart illustrating a third embodiment of the instant invention.

FIG. 18 is a flowchart illustrating a third embodiment of the instant invention. In the figure, a mobile station in fast active scanning mode is first provided with CAP information, as previously described. The station then specifies a list of CAPs that are to be examined based on the provided CAP information. Next, the station waits either until a ProbeDelay time has expired or until an indication that an incoming frame has been received.

Figure 2:
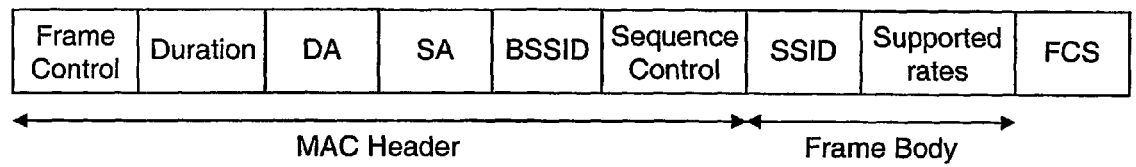
FIG. 2 is an example of the basic fields included in a probe request signal.
Figure 3:
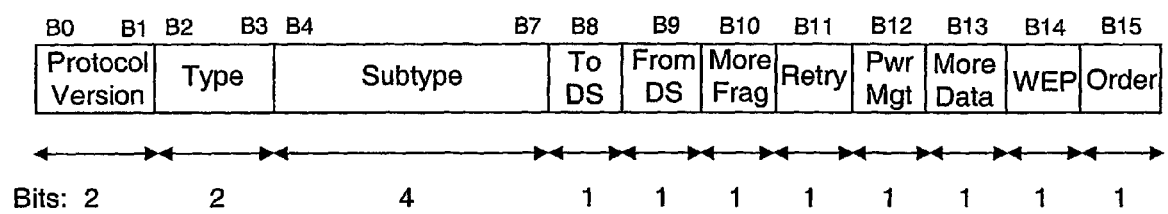
FIG. 3 is a diagram showing commonly incorporated bits that make up the control field of a probe request.
Figure 4:
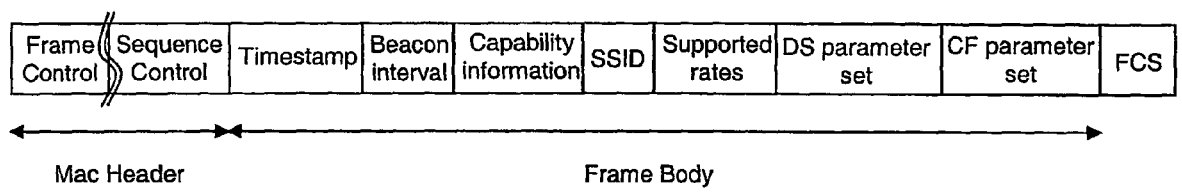
FIG. 4 is an example of the basic fields included a probe response signal.
Figure 5:
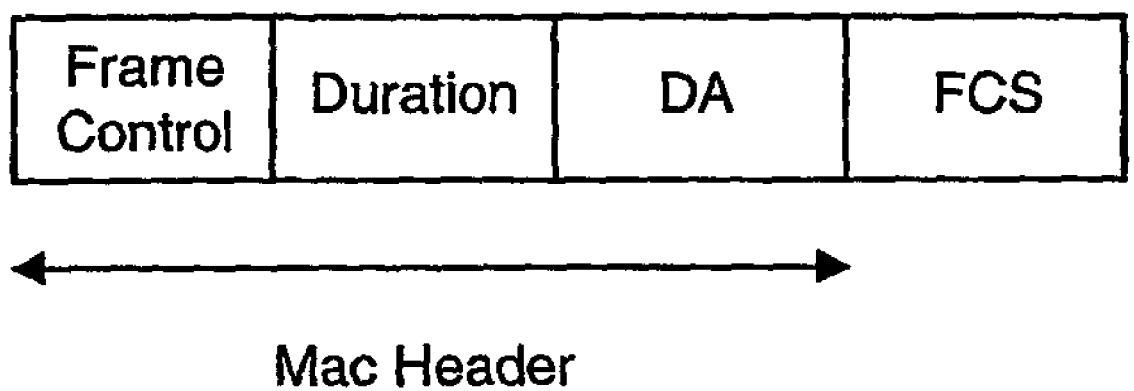
FIG. 5 is an example of the basic fields included in an acknowledgement signal.

The mobile station then sends a probe request signal similar to that shown in FIG. 2, but with the DA, BSSID and SSID fields filled with information as provided in Table 3. That is, the broadcast address will be entered in the DA field, the address of the CAP will be entered in the BSSID field, and either of the SSID of the CAP or the broadcast SSID will be entered in the SSID field of the probe request. The ProbeTimer is then cleared and begun. If the medium has not been detected as busy before the ProbeTimer reaches MinChannelTime, then the next CAP is scanned. Otherwise, any received probe responses are acknowledged and processed. Then, the next CAP is scanned. When all CAPs in the CAP list have been examined, the scanning process ends.

Notably, MinChannelTime in the third embodiment may be reduced to that not much greater than a SIFS value or even to the same value as the ACKTimeout.

Figure 19:
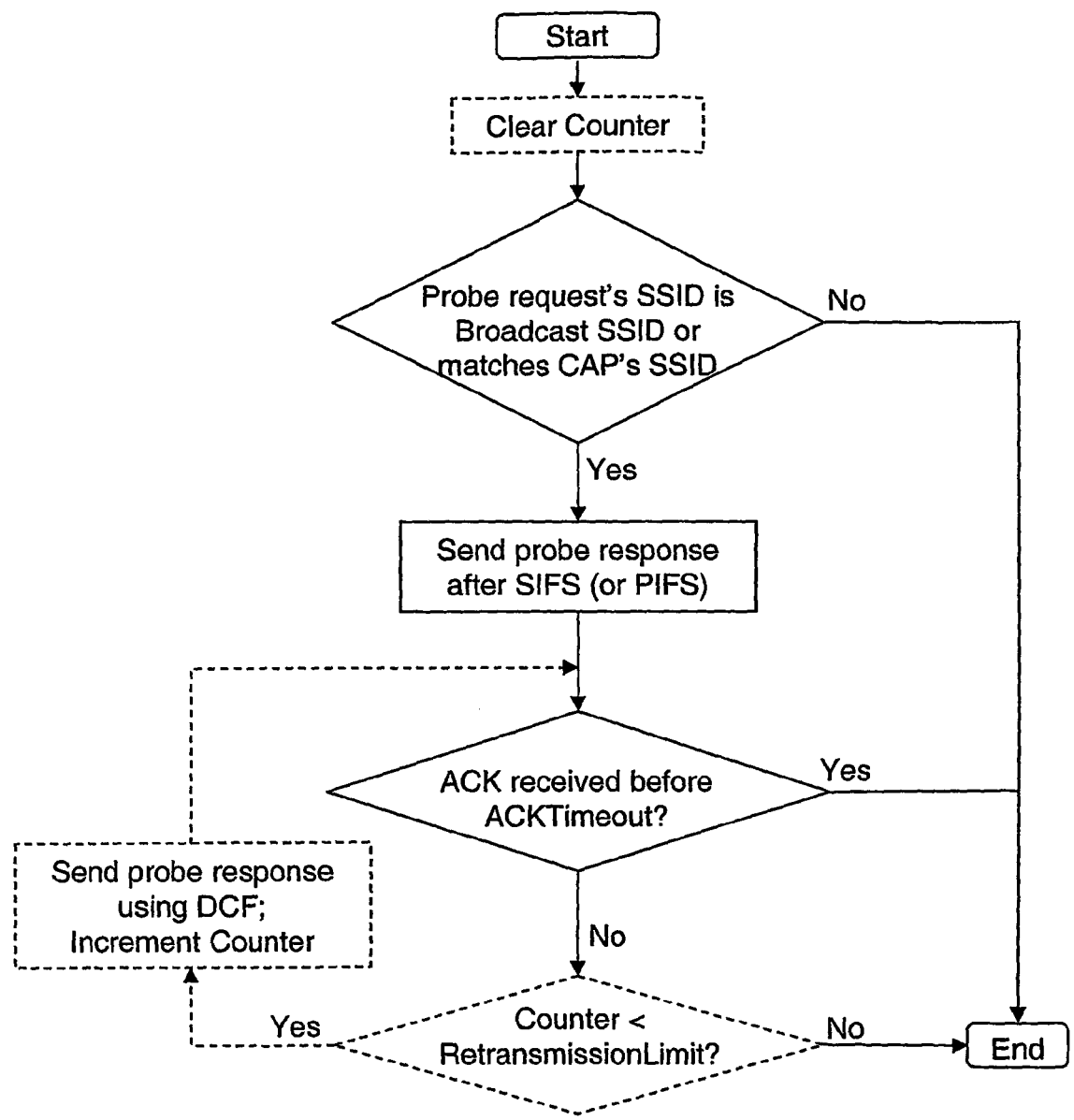
FIG. 19 is another flowchart illustrating the third embodiment.

FIG. 19 is a flowchart depicting the third embodiment of the instant invention. In FIG. 19, the CAP receiving the probe request signal responds with a probe response only if the SSID in the probe request is the broadcast SSID or if the SSID in the probe request matches the specific SSID of the CAP. What differentiates the third embodiment from other embodiments (such as the first and second embodiments), however, is that the transmission of the probe response is commenced immediately after an IFS period that is smaller than the DIFS period.

Although either of a SIFS or PIFS period may be employed in the third embodiment, the following description incorporates the use a SIFS period. (If a PIFS period is used, MinChannelTime should be set to a value not much greater than the PIFS period.) Accordingly, the designated CAP in the third embodiment has higher priority access to the wireless medium due to a shortened IFS period.

Figure 20:
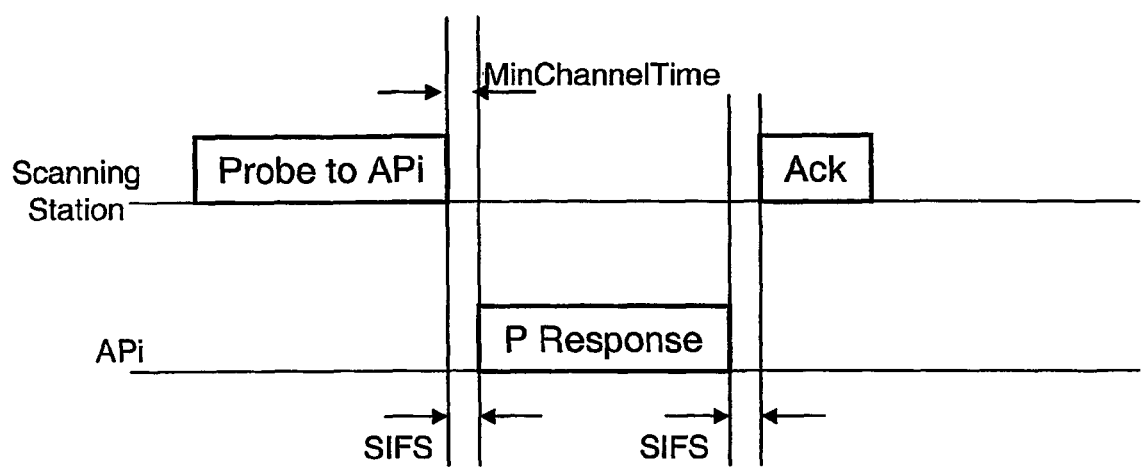
FIG. 20 depicts an exchange of frames in a handshake according to the third embodiment.

The probe response frame is acknowledged with an ACK signal sent by the scanning station. An entire frame exchange of the third embodiment is depicted in FIG. 20. In the Figure, a probe request is sent to a specific CAP. The minimum channel time has been reduced to the SIFS period, after which the CAP sends a probe response. After a further SIPS period, the probe response is acknowledged by the mobile station with an ACK signal.

Determination of availability of the CAP in the third embodiment is performed as follows. If the wireless medium is idle until ProbeTimer reaches MinChannelTime, the mobile station thus discerns that the designated CAP is not available in the area. If the wireless medium becomes busy before ProbeTimer reaches MinChannelTime, and the received probe response is from the designated CAP, the CAP is regarded as available to serve the mobile station. If the wireless medium becomes busy before ProbeTimer reaches MinChannelTime, and the received signal is other than the probe response signal from the designated CAP, the CAP is regarded as unavailable.

IV. Fourth Embodiment

While the third embodiment obeys the general receiving rule of the IEEE 802.11 WLAN standards that directed frames should be acknowledged with an ACK signal and that frames with group destination addresses are not acknowledged, the fourth embodiment loosens some of the general receiving rules of the IEEE 802.11 standards, allowing for more time-efficient scanning.

Figure 21:
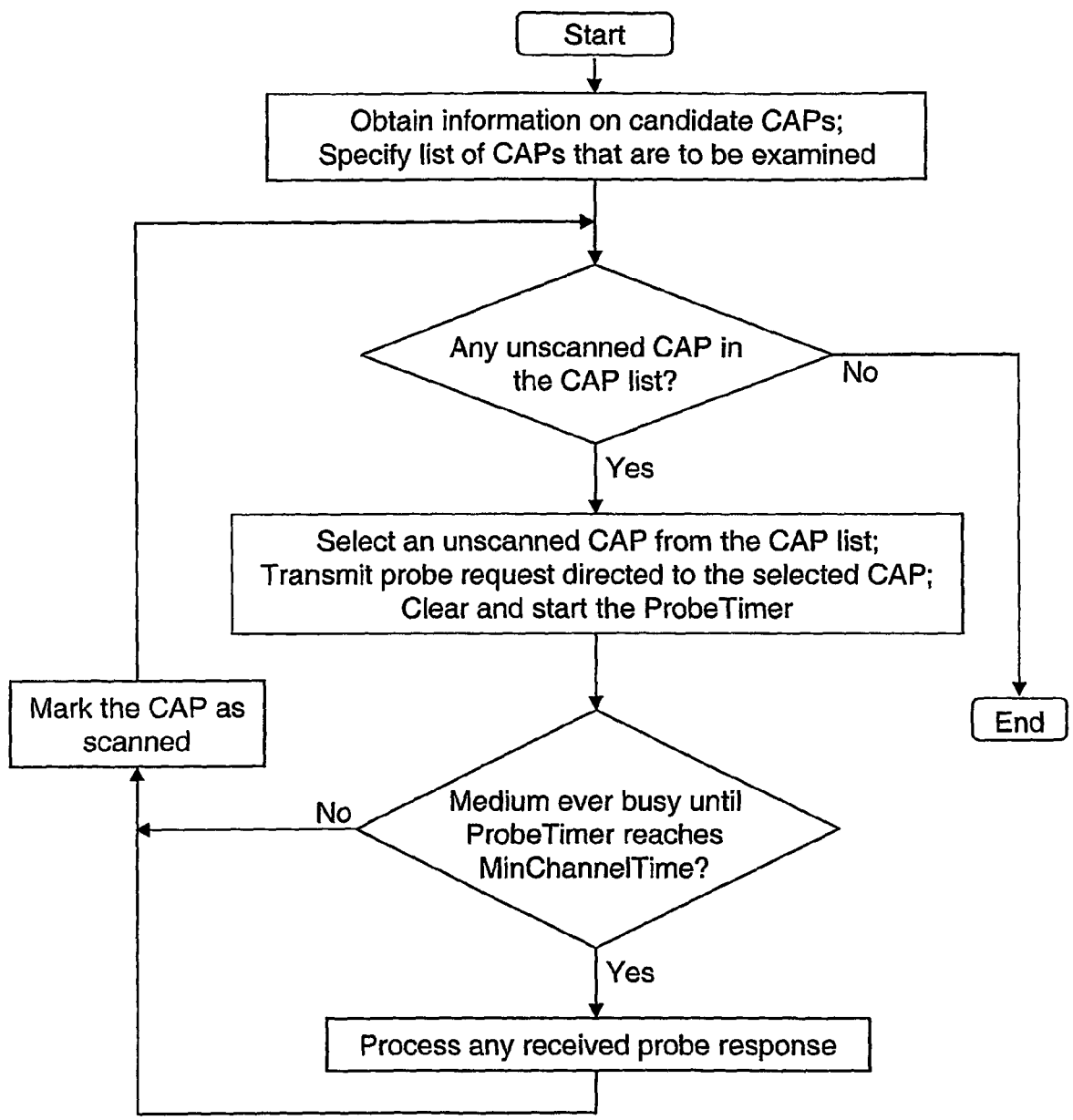
FIG. 21 is a flowchart which depicts fast active scanning according to a fourth embodiment of the instant invention.

FIG. 21 is a flowchart that depicts the fast active scanning of the fourth embodiment. In the figure, the mobile station is provided with CAP information from which a specific list of CAPs to be examined is created. If there are any CAPs in the list that have not been scanned, a CAP is selected for scanning and the mobile station transmits a probe request to the selected CAP (simultaneous to clearing and starting a Probe-Timer). In the transmitted probe request, the DA, BSSID and SSID fields are filled in with information corresponding to that shown in Tables 3 or 4.

If the wireless medium is not detected as busy prior to the ProbeTimer reaching MinChannelTime, then the next CAP is scanned. Otherwise, any received probe responses are processed. Subsequent CAPs are scanned until all CAPs in the list have been scanned.

In the fourth embodiment, MinChannelTime is a value only large enough to ensure the successful detection of frames transmitted using SIFS or PIFS periods, and preferably is set to a period not much greater than a SIFS period (if the probe response is sent with a SIFS period), or set to not much greater than a PIPS period (if the probe response is sent with a PIFS period). In a non-limiting version of the fourth embodiment, the probe response signal is sent with a SIFS period, and MinChannelTime is set to the same value as ACKTimeout.

In compliance with the general receiving rules of the IEEE 802.11 WLAN standards, only the access point designated by the scanning station receives the probe request signal that is sent with the DA, BSSID and SSID fields filled in according to the information provided in Tables 3 and 4. With further reference to FIG. 21, the CAP receiving the probe request signal responds with a probe response only if the SSID in the probe request is the broadcast SSID or if the SSID in the probe request matches the specific SSID of the CAP.

Probe response signals are sent, immediately after an IFS period that is smaller than a DIFS period, as directed frames to the address of the station that generated the probe request. Although either a SIFS or PIPS could be used, the fourth embodiment is described herein as using a SIFS period.

The probe response signal sent by the recipient of the probe request signal may be regarded as successful acknowledgement of the probe request signal. The probe response signal, however, is neither acknowledged nor expected to be acknowledged. The mobile station thus proceeds with scanning the next CAP in the list of CAPs without transmitting an ACK signal to the CAP that has transmitted a probe response.

Figure 22:
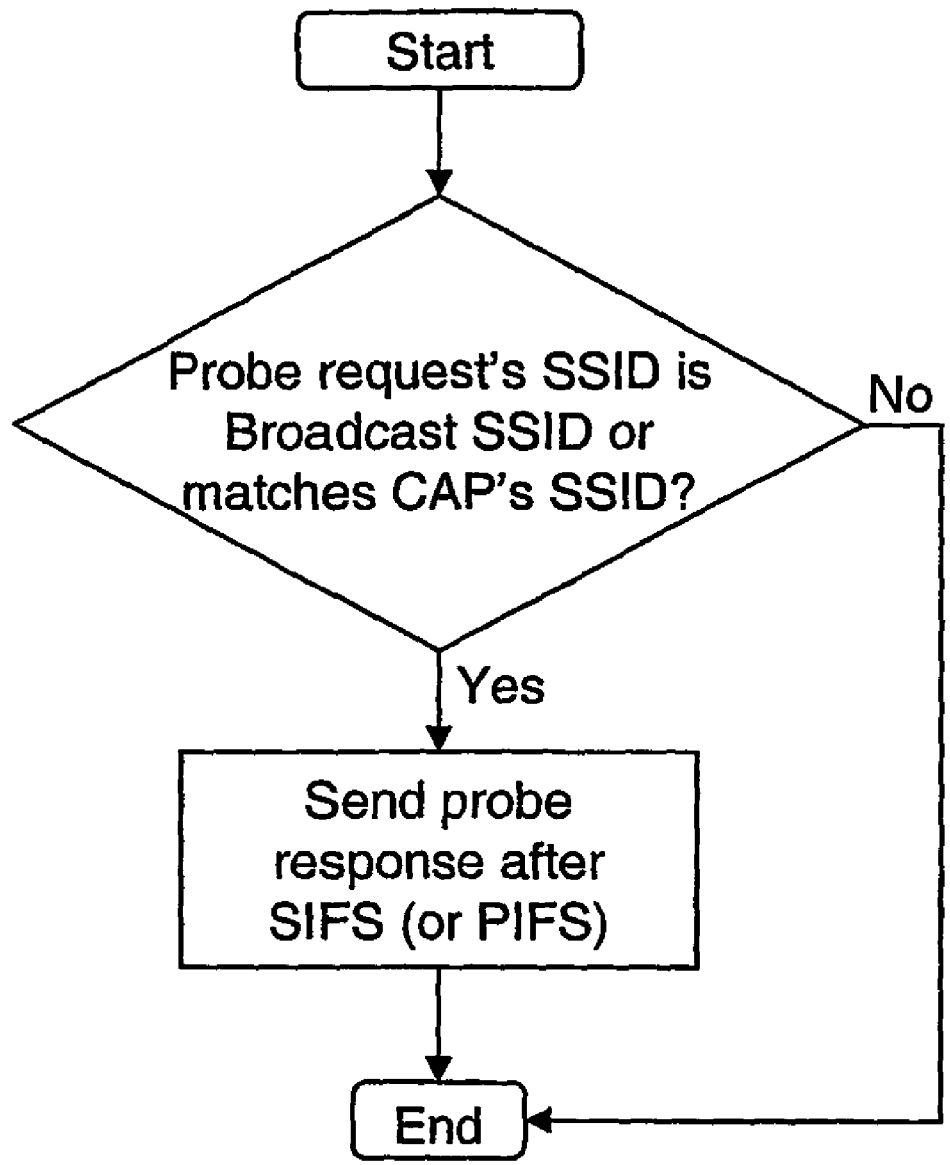
FIG. 22 is a flowchart that illustrates the procedure of a CAP (for the fourth embodiment) after receiving a probe request.

FIG. 22 illustrates the procedure of a CAP (for the fourth embodiment) after receiving a probe request. In the figure, if a probe request's SSID is the broadcast SSID or if the probe request's SSID matches the CAP's SSID, then a probe response is sent after either a SIFS or PIFS period.

Figure 23:
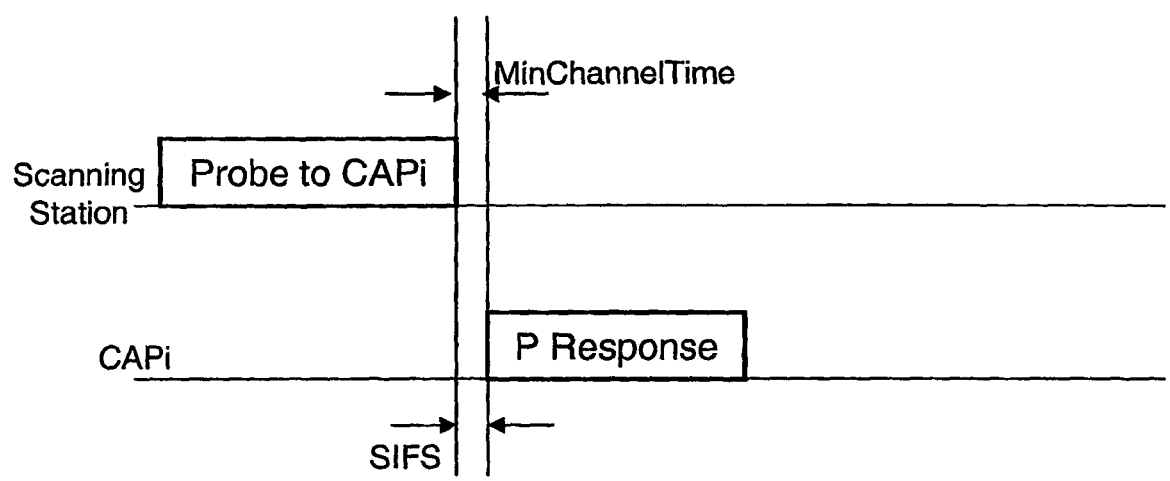
FIG. 23 depicts an exchange of frames in a handshake according to the fourth embodiment.

FIG. 23 depicts an entire frame exchange of the fourth embodiment. In the figure, the CAP responds to a response request with a probe response signal after a SIFS (or PIFS) period. Determination of availability of the CAP in the fourth embodiment is performed as follows. If the wireless medium is idle until ProbeTimer reaches MinChannelTime, the mobile station thus discerns that the designated CAP is not available in the area. If the wireless medium becomes busy before ProbeTimer reaches MinChannelTime, and the received probe response signal is from the designated CAP, the CAP is regarded as available to serve the mobile station. If the wireless medium becomes busy before ProbeTimer reaches MinChannelTime, and the received signal is other than the ACK signal from the designated CAP, the CAP is regarded as unavailable.

V. Fifth Embodiment

When transmitting a probe request in conventional methods, a scanning station must contend for the wireless medium under the access procedure provided by the DCF. Although this ensures fairness of opportunity among any transmitting stations, it is also time-consuming. Therefore, in the fifth embodiment of the instant invention, after transmitting a first probe request signal under the basic rules of the DCF, a scanning station is then allowed a higher priority transmission opportunity (the number of which may be restricted in fairness to other mobile stations which may be attempting to transmit their own probe request signals).

Figure 24:
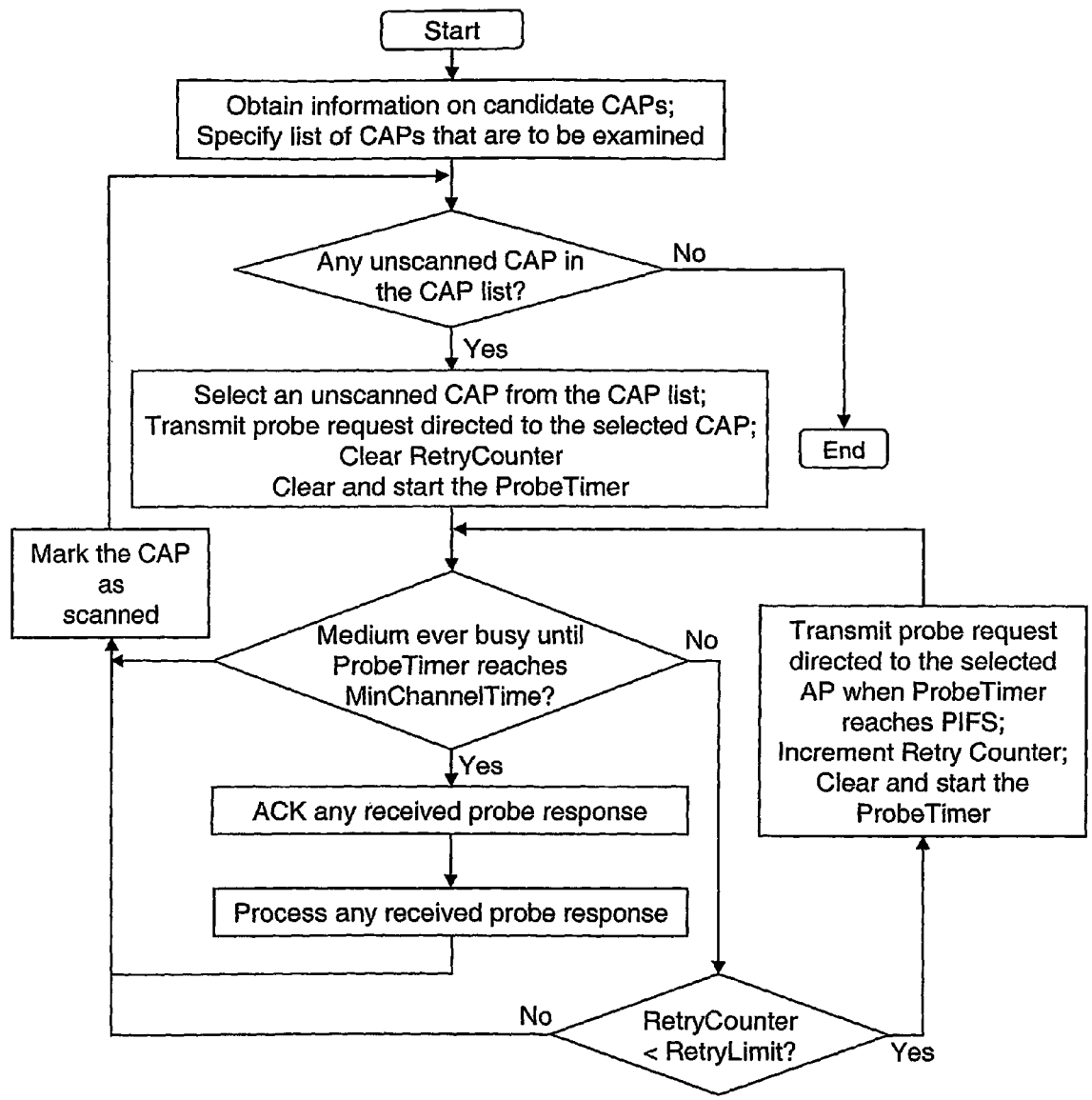
FIG. 24 is a flowchart illustrating a fifth embodiment of the instant invention.

The fifth embodiment is a modification of embodiments 2, 3 and 4 and is shown by the flowchart depicted in FIG. 24. In the fifth embodiment, a SIFS period is used for the IFS period between a probe request signal and probe response signal. If the SIFS period lapses without the receipt of the expected probe response signal, the mobile station is then allowed to resend the probe request signal as soon as one PIFS period after transmission of the probe request. This permits the scanning station to retain control of the wireless medium until an allowed retransmission limit (RetryLimit) has been reached.

Figure 25:
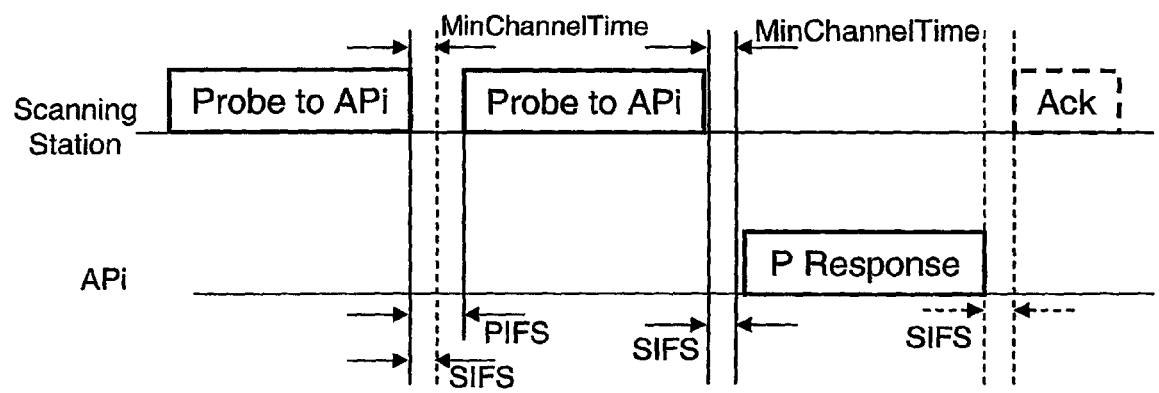
FIG. 25 depicts an exchange of frames in a handshake according to the fifth embodiment (incorporating elements of the third and fourth embodiments)
Figure 26:
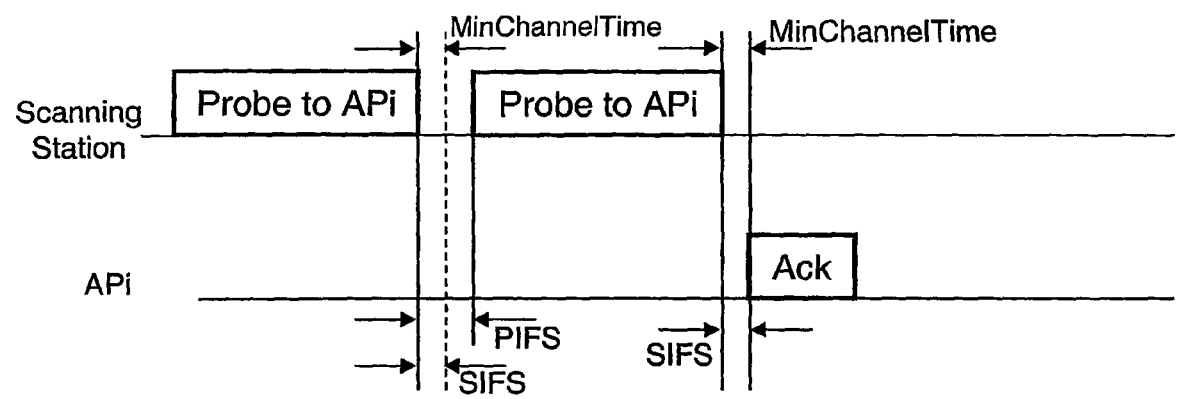
FIG. 26 depicts an exchange of frames in a handshake according to the fifth embodiment (incorporating elements of the second embodiment)

An entire frame exchange of the fifth embodiment with a RetryLimit of 1 is illustrated in FIG. 25 (incorporating elements of previously described embodiments 3 and 4) and FIG. 26 (incorporating elements of previously described embodiment 2). In FIG. 25 and FIG. 26, an initial probe request signal has not been responded to within the PIFS period by an appropriate probe response and ACK, respectively. Accordingly, the mobile station retransmits another probe request at the end of the PIFS period. As further shown in the figures, an appropriate probe response and ACK is received after the second transmission of the probe request. An acknowledgment signal may or may not be transmitted in response to the probe response signal in FIG. 25.

VI. Sixth Embodiment

In a sixth embodiment of the invention, employment of the fast active scanning as provided in any of the previous embodiments is made optional in conjunction with conventional scanning. By way of explanation, conventional scanning and fast active scanning (per disclosed embodiments of the invention) use different values in the DA and BSSID fields of a probe request. That is, conventional scanning uses broadcast destination and broadcast BSSID in the probe request signal, while the invention uses the address of the CAP in the DA or BSSID fields.

Therefore, the sixth embodiment deploys conventional scanning techniques if either the broadcast destination or the broadcast BSSID is used in the DA and BSSID fields of a probe request, respectively. Conversely, if the address of the CAP is used in either the DA or BSSID fields of the probe request, the CAP uses fast active scanning (as provided herein by deployment of an embodiment of the invention). In deploying either of the scanning methods, the probe request uses types bits of 00 and subtype bits of 0100 in the frame control field.

VII. Seventh Embodiment

In the seventh embodiment of the invention, scanning methods are distinguished by explicit indication in the header of the probe request signal. In this embodiment, the explicit notification desirably uses reserved type bits and subtype bits of the frame control field as depicted in Table 1. More desirably, the explicit notification uses reserved subtype bits for the management field.

For example, type bits of 00 and subtype bits of 1110 in the frame control field are assigned to indicate the active scanning according to the second embodiment of the invention, while type bits of 00 and subtype bits of 1111 are assigned to indicate the fast active scanning of the fourth embodiment of the invention. As in Table 1, type bits of 00 and subtype bits of 0100 in the frame control field are used to indicate conventional active scanning. Therefore, in the seventh embodiment, the active scanning method to be deployed by the CAP is determined as follows.

If the probe request, in the frame control field, has the pair of type bits and subtype bits that are assigned to indicate a specific fast active scanning method, the CAP uses the indicated fast active scanning method. The CAP will allow probe request signals of assigned type and subtype bits even before authentication or association, without filtering.

VIII. Eighth Embodiment

In an eighth embodiment of the invention, scanning methods are distinguished by explicit indication in the header and frame body of probe request signals. Preferably, the explicit notification uses predetermined fields in the frame body of the action frame (i.e., type bits 00 and subtype bits 1101 in the frame control field).

Figure 27:
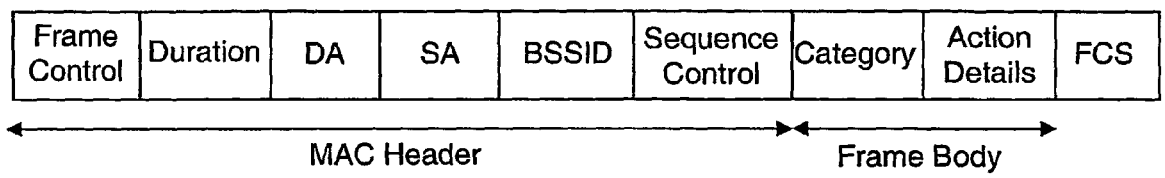
FIG. 27 is an example of frames including the format of action frames.

The action frame provides a mechanism for specifying extended management actions. The format of the action field is shown by example in FIG. 27. The category field will be set to one of the non-reserved values shown below in Table 5.

TABLE 5

| Category Values | |
|---|---|
| Name | Value |
| Reserved | 0-2 |
| Radio measurement | 3 |
| Reserved | 4-127 |
| Error | 128-255 |

The action details field contains the details of the action. The details of the actions allowed in each category include a radio measurement category with action field values, for instance, those values depicted in Table 6, below.

TABLE 6

| Radio measurement action field values | |
|---|---|
| Action field value | Description |
| 0 | Measurement Request |
| 1 | Measurement Report |
| 2-255 | Reserved |

In any reserved category, values may be used to explicitly indicate the specific fast active scanning to be used. For example, a category value of 4 may be assigned to indicate the fast active scanning according to the second embodiment, while a category value of 5 may be assigned to indicate the active scanning of the fourth embodiment. Therefore, determination of the fast active scanning method to be deployed is determined as follows. In the predetermined header or frame body of a probe request, if the specific value that is assigned to indicate a specific fast active scanning method is found, the CAP uses the indicated fast active scanning method. The CAP will not filter out probe request signals of assigned type and subtype bits even before authentication or association.

Additional Embodiments

Figure 1:
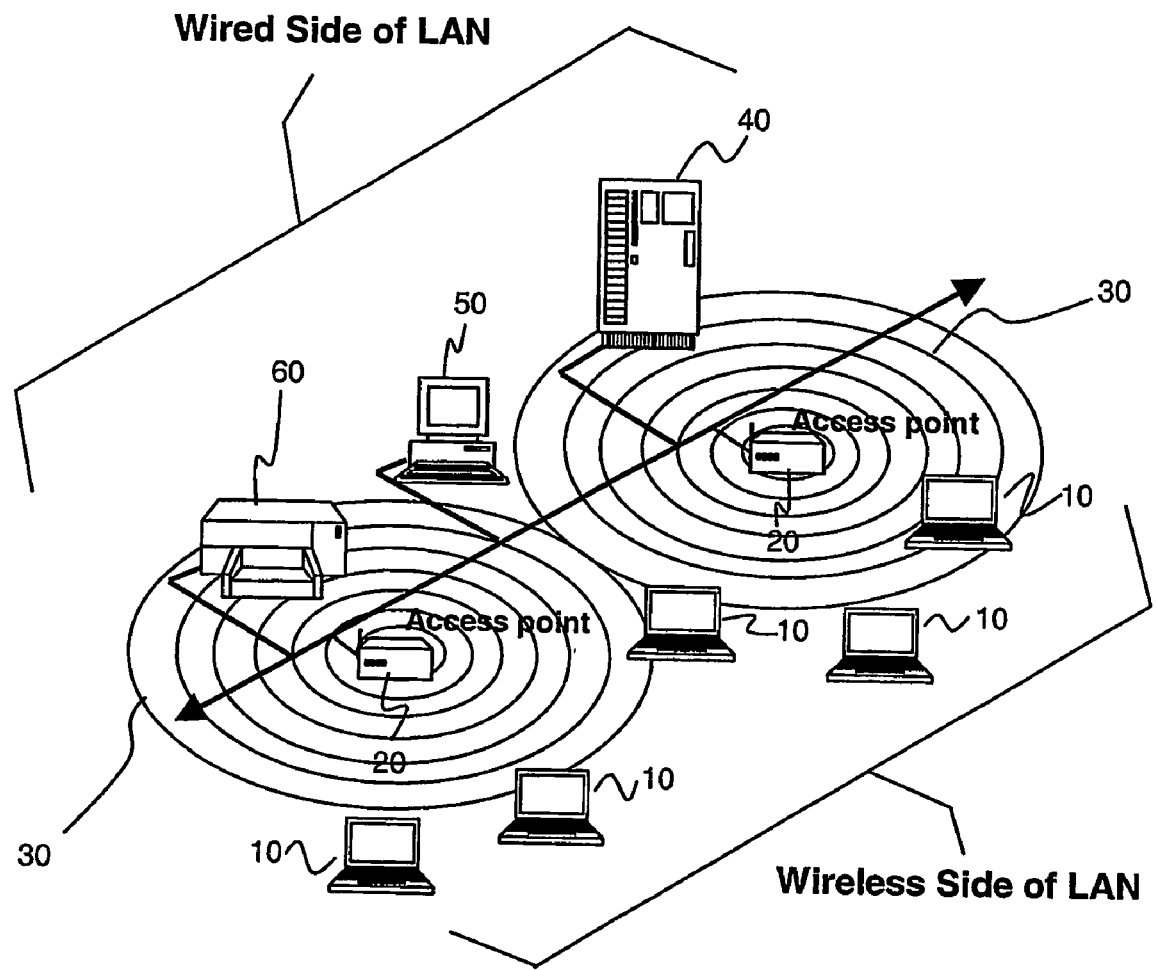
FIG. 1 is an illustration of a wireless local area network.
Figure 28:
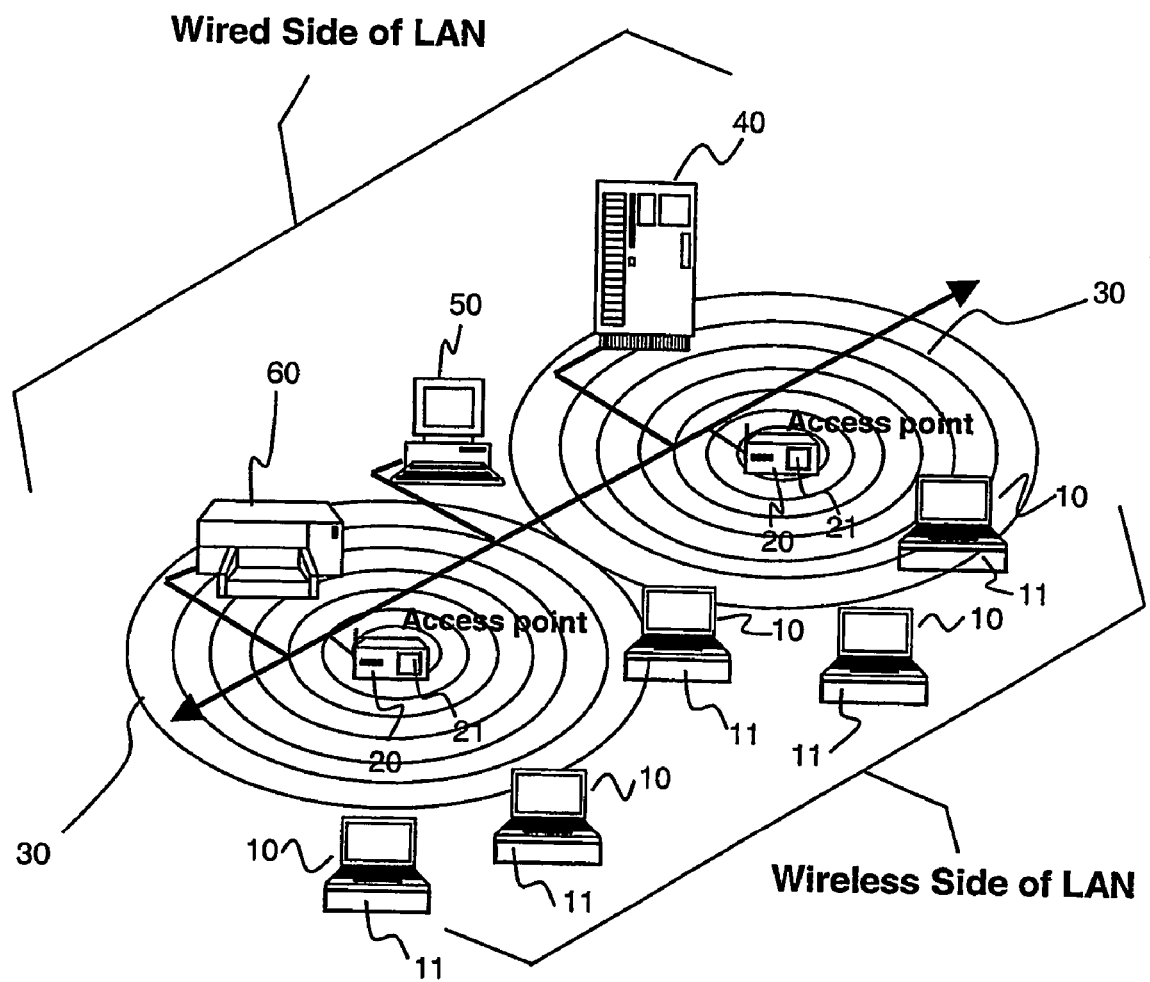
FIG. 28 illustrates an example of a processor or processors that may be used in the candidate access points and the mobile stations of the instant invention.

FIG. 28, which is similar in nature to FIG. 1, depicts an embodiment of the invention including at least one processor 21 that, as part of a candidate access point 20, is capable of processing candidate access point information that differentiates between candidate access points which are most likely to provide communication and candidate access points which are not, according to one or more of the embodiments of the invention described herein.

FIG. 28 also depicts a further embodiment of the invention including at least one processor 11 that, as part of a wireless station 10, is capable of processing candidate access point information that differentiates between candidate access points which are most likely to provide communication and candidate access points which are not, also according to one or more of the embodiments of the invention described herein.

Although probe responses are described herein as directed frames sent to the scanning station, the probe responses could also be a broadcast frame or a multicast frame to a set of stations. Additionally, the fields in the probe response described herein for informing the scanning station of the characteristics of the AP are not always required in their listed entirety. Some or all of the fields can be removed. Furthermore, although specific frame formats are depicted herein for both the probe request and probe response, the invention is not constrained by any specific frame format. Further, the terms "field" and "frame" may be used analogously herein.

Also, the IEEE standards described herein use a network allocation vector ("NAV") for directed frame transmission to secure the channel for the subsequent atomic frame transmissions. This can be used for any of the embodiments described herein without change. In embodiments 3, 4 and 5, NAV can even be used for the probe request signal with a broadcast destination address, since these embodiments expect effectively only one recipient (even though they are broadcast). The NAV value for the probe request in embodiments 3, 4 and 5 could thus be set to the sum of SIPS and the transmission time of the probe request and probe response with a minimum size.

Moreover, as previously noted, the invention is herein explained through use of the IEEE 802.11 WLAN standards. The invention may readily be applied to other wireless communication systems, including but not limited to those mentioned throughout the specification.

Advantageous characteristics in the embodiments of the present invention include reduced scanning time and handshake latency while simultaneously reducing handshake susceptibility to misjudgment without increasing the number of times a probe request is retransmitted and also without increasing either of MinChannelTime or MaxChannelTime.

The previous description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:
1. A method of enabling active channel scanning in a wireless network, said method comprising:
   collecting candidate access point information that differentiates between candidate access points that are available for association;

selecting a candidate access point from said candidate access points based on said candidate access point information; and transmitting a probe request, said probe request including an address of said selected access point that is specified in a basic service set identification field, wherein, if said selected candidate access point does not respond to said probe request within an interframe space period that immediately follows said probe request and that interframe space period is shorter than a distributed interframe space period, said wireless station resends said probe request in the time period after said interframe space period that immediately follows said probe request has ended but prior to the time period that a distributed interframe space period would have ended if said distributed interframe space period had begun at the same time as said interframe space period that immediately follows said probe request.

2. A wireless station in a wireless communications network comprising:
- a collector which collects candidate access point information that differentiates between candidate access points that are available for association;
- a selector that, based on the candidate access point information, selects a candidate access point from said candidate access points; and
- a transmitter for transmitting a probe request, said probe request including an address of said selected candidate access point that is specified in a basic service set identification field, wherein, if said selected candidate access point does not respond to said probe request within an interframe space period that immediately follows said probe request and that interframe space period is shorter than a distributed interframe space period, said wireless station resends said probe request in the time period after said interframe space period that immediately follows said probe request has ended but prior to the time period that a distributed interframe space period would have ended if said distributed interframe space period had begun at the same time as said interframe space period that immediately follows said probe request.

3. A wireless access point among a plurality of access points in a telecommunications system that are available for association, comprising:
- a receiver that receives a probe request from a wireless station, said probe request including an address of said wireless access point that is specified in a basic service set identification field; and
- a transmitter for transmitting a response to said probe request, wherein, if said wireless access point does not respond to said probe request within an interframe space period that immediately follows said probe request and that is shorter than a distributed interframe space period, said wireless station resends said probe request in the time period after said interframe space period that immediately follows said probe request has ended but prior to the time period that a distributed interframe space period would have ended if, said distributed interframe space period had begun at the same time as said interframe space period that immediately follows said probe request.

4. A wireless telecommunications system comprising
a plurality of access points, wherein at least one of the access points comprises a processor which processes candidate access point information that differentiates between candidate access points that are available for association; and
a wireless terminal which, based on said candidate access point information, selects one of said access points and transmits a probe request, said probe request including an address of said candidate access point that is specified in a basic service set identification field, wherein, if said selected access point does not respond to said probe request within an interframe space period that immediately follows said probe request and that interframe space period is shorter than a distributed interframe space period, said wireless station resends said probe request in the time period after said interframe space period that immediately follows said probe request has ended but prior to the time period that a distributed interframe space period would have begun if said distributed interframe space period had begun at the same time as said interframe space period that immediately follows said probe request.

5. A wireless telecommunications system comprising:
a plurality of wireless stations, wherein at least one of the wireless stations comprises a processor which processes candidate access point information that differentiates between candidate access points that are available for association; and
a wireless station that, based upon said candidate access point information, selects an access point and transmits a probe request, said probe request including an address of said selected access point that is specified in a basic service set identification field, wherein, if said selected access point does not respond to said probe request within an interframe space period that immediately follows said probe request and that is shorter than a distributed interframe space period, said wireless station resends said probe request in the time period after said interframe space period that immediately follows said probe request has ended but prior to the time period that a distributed interframe space period would have ended if said distributed interframe space period had begun at the same time as said interframe space period that immediately follows said probe request.

* * * * *